US012389264B2

(12) United States Patent
Lee et al.

(10) Patent No.: US 12,389,264 B2
(45) Date of Patent: Aug. 12, 2025

(54) COMMUNICATION DEVICE MOUNTED ON VEHICLE AND OPERATION METHOD THEREFOR

(71) Applicant: Samsung Electronics Co., Ltd., Suwon-si (KR)

(72) Inventors: Jaewoong Lee, Suwon-si (KR); Seungjin Yu, Suwon-si (KR); Woong Lee, Suwon-si (KR); Yuseon Lee, Suwon-si (KR); Changwon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 18/184,977

(22) Filed: Mar. 16, 2023

(65) Prior Publication Data

US 2023/0217301 A1    Jul. 6, 2023

Related U.S. Application Data

(63) Continuation of application No. PCT/KR2021/012494, filed on Sep. 14, 2021.

(30) Foreign Application Priority Data

Sep. 16, 2020    (KR) .................. 10-2020-0119380

(51) Int. Cl.
*H04W 28/02* (2009.01)
*H04W 4/46* (2018.01)
*H04W 76/14* (2018.01)

(52) U.S. Cl.
CPC ......... *H04W 28/0268* (2013.01); *H04W 4/46* (2018.02); *H04W 76/14* (2018.02)

(58) Field of Classification Search
None
See application file for complete search history.

(56) References Cited

U.S. PATENT DOCUMENTS 9,288,729 B2 *  3/2016  Jang ................. H04W 36/0005
9,319,127 B2    4/2016  Kim et al.
(Continued)

FOREIGN PATENT DOCUMENTS

JP          6528798 B2     6/2019
KR      10-1415668 B1     7/2014
(Continued)

OTHER PUBLICATIONS

International Search Report dated Dec. 30, 2021, issued in International Patent Application No. PCT/KR2021/012494.

*Primary Examiner* — Hong S Cho
(74) *Attorney, Agent, or Firm* — Jefferson IP Law, LLP

(57) ABSTRACT

A communication device mounted on a vehicle and an operation method of the communication device are provided. The communication device performs a connection with a communication terminal included in a vehicle stopped or driving in a vicinity of the vehicle via device-to-device communication, provide subscriber identity module (SIM) information to the connected communication terminal, request execution of a communication relay function from the communication terminal, and in response to a communication relay function acceptance signal being received from the communication terminal, transmit and receive data to and from the base station by using the communication terminal as a communication relay.

15 Claims, 11 Drawing Sheets

(56) References Cited

U.S. PATENT DOCUMENTS

| | | |
|---|---|---|
| 9,425,884 B2 | 8/2016 | Lim et al. |
| 9,667,290 B2 | 5/2017 | Ouyang et al. |
| 10,880,724 B2 | 12/2020 | Song et al. |
| 10,912,007 B2 * | 2/2021 | Freda .................... H04B 7/155 |
| 11,272,421 B2 | 3/2022 | Iwata |
| 2016/0323870 A1 * | 11/2016 | Wei ....................... H04W 72/51 |
| 2017/0359766 A1 | 12/2017 | Agiwal et al. |
| 2018/0199390 A1 | 7/2018 | Hahn et al. |
| 2018/0206176 A1 | 7/2018 | Panteleev et al. |
| 2018/0288672 A1 | 10/2018 | Sai |
| 2018/0332652 A1 | 11/2018 | Kim et al. |
| 2019/0349746 A1 | 11/2019 | Song et al. |
| 2021/0084555 A1 | 3/2021 | Feng |

FOREIGN PATENT DOCUMENTS

| | | |
|---|---|---|
| KR | 10-2015-0130254 A | 11/2015 |
| KR | 10-1741154 B1 | 6/2017 |
| KR | 10-2017-0096626 A | 8/2017 |
| KR | 10-2018-0053740 A | 5/2018 |
| KR | 10-2018-0125455 A | 11/2018 |
| WO | 2017/018553 A1 | 2/2017 |

\* cited by examiner

COMMUNICATION DEVICE MOUNTED ON VEHICLE AND OPERATION METHOD THEREFOR

CROSS-REFERENCE TO RELATED APPLICATION(S)

This application is a continuation application, claiming priority under § 365(c), of an International Application No. PCT/KR2021/012494, filed on Sep. 14, 2021, which is based on and claims the benefit of a Korean patent application number 10-2020-0119380, filed on Sep. 16, 2020, in the Korean Intellectual Property Office, the disclosure of which is incorporated by reference herein in its entirety.

BACKGROUND

1. Field

The disclosure relates to a communication device mounted on a vehicle and an operation method of the communication device.

2. Description of Related Art

Recently, vehicle-to-everything (V2X) communication has been used to allow vehicles to transmit and receive data through wired and wireless communication networks. V2X communication requires low latency and high data rates to perform data transmission and reception for autonomous driving of a vehicle, high-definition (HD) map data updates, over-the-air (OTA) vehicle operating system updates, or the like. In particular, for autonomous driving of a vehicle, high data rates and low latency are required because the vehicle needs to exchange data in real time with a camera, a light detection and ranging (LiDAR) sensor, a radio detection and ranging (RADAR) sensor, or a server in order to improve a recognition rate of the surrounding environment, such as with respect to a road on which the vehicle is traveling or nearby vehicles.

In order to achieve high data rates and low latency, V2X communication employs millimeter wave (mmWave) communication. In order for a vehicle supporting mmWave communication functions to communicate with a base station, a beam direction of signals transmitted and received via a mmWave antenna module installed in the vehicle needs to match a beam direction of signals transmitted and received via an antenna of a base station. To efficiently perform data transmission and reception using the mmWave antenna module, the vehicle continuously checks surrounding signals even while moving or stationary, and adjusts beamforming to steer a beam toward the base station.

The above method may be effective for data transmission and reception while the vehicle is stationary, but in an environment, such as in an urban driving environment, where directions of signals transmitted and received between an antenna of the vehicle and the base station change in real time and communication is interfered with or interrupted by nearby vehicles, it is difficult to maintain the quality of data transmission and reception, and efficiency of data transmission and reception deteriorates. In particular, a general passenger car with a low body may be more likely to suffer signal interference than vehicles with a high body, such as trucks or buses. Therefore, the quality of a mmWave communication channel may not be consistent and may vary even for the same type of vehicles driving on the same road.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication device and operation method thereof for requesting a communication relay function from a vehicle stopped or driving in a vicinity of a vehicle when a connection with a base station via millimeter wave (mmWave) communication is released or the quality of a communication channel deteriorates, and performing data transmission and reception with the base station by using the communication relay function.

Additional aspects will be set forth in part in the description which follows and, in part, will be apparent from the description, or may be learned by practice of the presented embodiments.

In accordance with an aspect of the disclosure, an operation method of a communication device mounted on a vehicle is provided. The operation method includes identifying, from among vehicles stopped or driving in a vicinity of the vehicle, at least one vehicle including a communication terminal capable of connecting via device-to-device (D2D) communication, identifying whether at least one communication terminal included in the at least one vehicle, respectively, is able to perform a communication relay function with a base station, based on identifying that the at least one communication terminal is able to perform the communication relay function with the base station, connecting with the at least one communication terminal via the D2D communication, after connecting with the at least one communication terminal, transmitting, to the at least one communication terminal, subscriber identity module (SIM) information of the communication device, obtaining information about a quality of each communication channel generated between the at least one communication terminal and the base station, respectively, and storing the information about the quality of each communication channel, respectively, based on a quality of a communication channel generated between the communication device and the base station deteriorating, requesting execution of a communication relay function from a determined communication terminal determined among the at least one communication terminal based on a communication channel quality, and in response to a communication relay function acceptance signal being received from the determined communication terminal, transmitting and receiving data to and from the base station by using the communication relay function performed by the determined communication terminal.

In an embodiment, the requesting of the execution of the communication relay function from the communication terminal may include determining a communication terminal having a highest communication channel quality indicator, based on pieces of information about a communication channel quality respectively obtained from the at least one communication terminal, and requesting execution of the communication relay function from the determined communication terminal.

In an embodiment, the obtained information about the quality of the communication channel may include at least one of strength information of a signal received by each of the at least one communication terminal from the base station, signal-to-noise ratio information, and bandwidth information of the communication channel.

In an embodiment, the operation method may further include obtaining driving information including location information, driving direction information, destination information, and route information from each of the at least one vehicle, and the determining of the communication terminal from which to request the execution of the communication relay function may include selecting one of the at least one communication terminal based on at least one of the driving information and information about the communication channel quality.

In an embodiment, the D2D communication may include at least one of wireless fidelity (Wi-Fi) direct, mobile Bluetooth™, long term evolution-D2D (LTE-D2D), and fifth generation (5G) D2D.

In an embodiment, the operation method may further include monitoring a quality of a first communication channel generated between the communication device and the base station.

In an embodiment, the operation method may further include comparing information about the quality of the first communication channel, which is obtained via the monitoring, with information about a quality of a second communication channel for the communication terminal performing the communication relay function, and determining, based on a result of the comparing, whether to release a D2D connection with the communication terminal.

In an embodiment, the determining of whether to release the D2D connection may include, when the quality of the first communication channel is superior to the quality of the second communication channel, determining to release the D2D connection with the communication terminal and directly connecting to the base station via mmWave communication.

In an embodiment, the operation method may further include receiving a relay function execution request signal from at least one nearby vehicle and performing, in response to the received relay function execution request signal, a relay function for data transmission and reception between the base station and the at least one nearby vehicle.

In accordance with another aspect of the disclosure, a communication device mounted on a vehicle is provided. The communication device includes an mmWave antenna circuit configured to perform a connection with a base station via mmWave communication and transmit and receive data, and a modulator-demodulator (modem) connected to the mmWave antenna circuit and configured to control an operation of the mmWave antenna module, the modem includes a memory storing a program including one or more instructions, a processor configured to execute the one or more instructions of the program stored in the memory, an SIM information storage storing subscriber identity information of the communication device, and a D2D communication interface configured to perform D2D communication with at least one communication terminal, and the processor identifies, from among vehicles stopped or driving in a vicinity of the vehicle, at least one vehicle including a communication terminal capable of connecting via D2D communication, identifies whether at least one communication terminal included in the at least one vehicle, respectively, is able to perform a communication relay function with the base station, based on identifying that the at least one communication terminal is able to perform the communication relay function with the base station, control the D2D communication interface to connect with at least one communication terminal via the D2D communication, after connecting with the at least one communication terminal, transmit the subscriber identity information to the at least one communication terminal, obtain information about a quality of each communication channel generated between the at least one communication terminal and the base station, respectively, based on a quality of a communication channel generated between the communication device and the base station deteriorating, request execution of a communication relay function from a determined communication terminal determined among the at least one communication terminal based on a communication channel quality, and in response to a communication relay function acceptance signal being received from the determined communication terminal, transmit and receive data to and from the base station by using the communication relay function performed by the determined communication terminal.

In an embodiment, the processor may determine a communication terminal having a highest communication channel quality indicator, based on pieces of information about a communication channel quality respectively obtained from the at least one communication terminal.

In an embodiment, the processor may control the D2D communication interface to transmit a signal for requesting execution of a communication relay function to the determined communication terminal.

In an embodiment, the communication device may further include a database for storing pieces of information about a communication channel quality respectively obtained from the at least one communication terminal.

In an embodiment, the obtained information about the quality of the communication channel may include at least one of strength information of a signal received by each of the at least one communication terminal from the base station, signal-to-noise ratio information, and bandwidth information of the communication channel.

In an embodiment, the processor may obtain driving information including location information, driving direction information, destination information, and route information from each of the at least one vehicle, and select one of the at least one communication terminal based on at least one of the driving information and information about the communication channel quality.

In an embodiment, the processor may monitor a quality of a first communication channel generated between the communication device and the base station.

In an embodiment, the processor may compare information about the quality of the first communication channel, which is obtained via the monitoring, with information about a quality of a second communication channel for the communication terminal performing the communication relay function and determine, based on a result of the comparing, whether to release a D2D connection with the communication terminal.

In an embodiment, when the quality of the first communication channel is superior to the quality of the second communication channel, the processor may determine to release the device-to-device connection with the communication terminal and directly connect to the base station via the mmWave communication.

In an embodiment, the processor may receive a relay function execution request signal from at least one nearby vehicle via the D2D communication interface and perform, in response to the received relay function execution request signal, a relay function for data transmission and reception between the base station and the at least one nearby vehicle.

In accordance with another aspect of the disclosure, a computer program product is provided. The computer program product includes a non-transitory computer-readable storage medium having recorded thereon a program to be executed on a computer is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
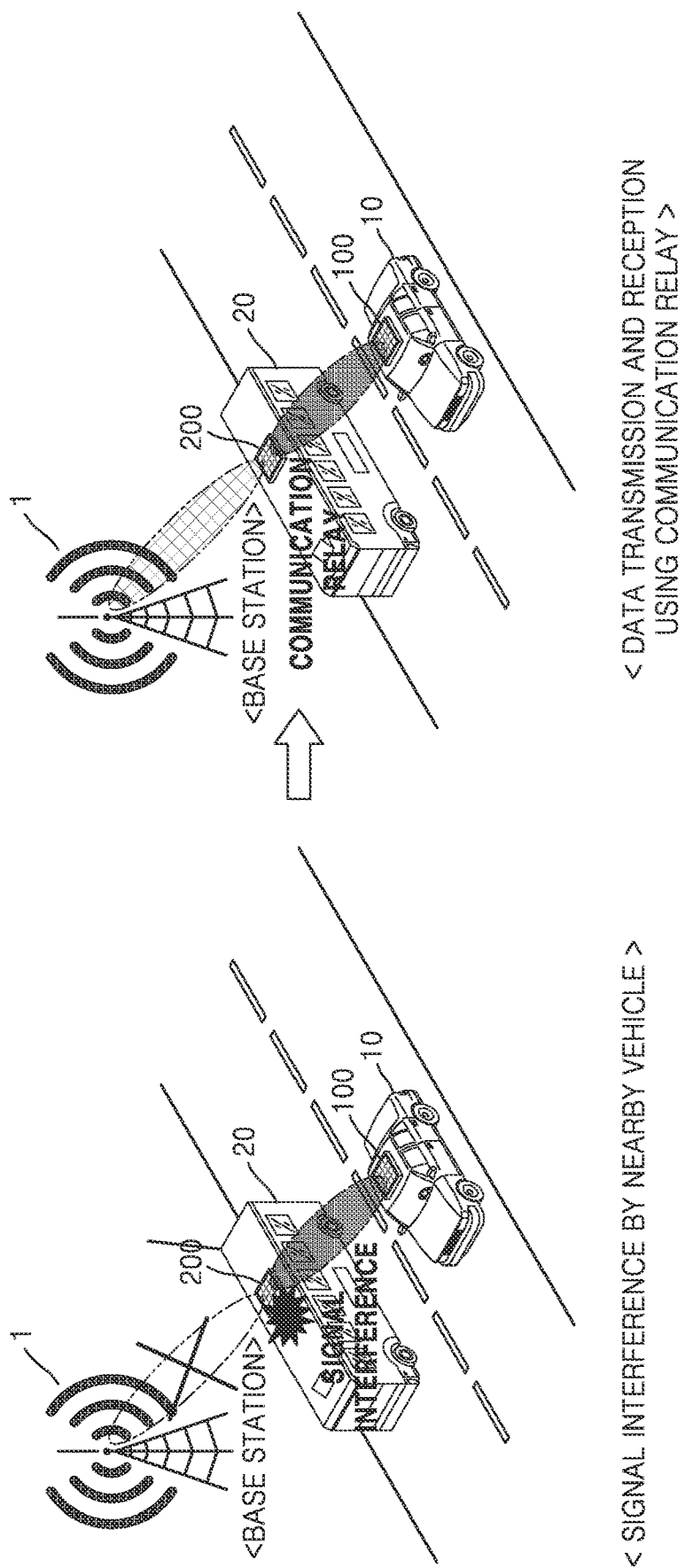
FIG. 1 is a conceptual diagram for describing an operation method of a communication device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As the terms used herein, general terms that are currently widely used are selected by taking functions in the disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment. Thus, the terms used herein should be defined not by simple appellations thereof but based on the meaning of the terms together with the overall description of the disclosure.

All the terms used herein, which include technical or scientific terms, may have the same meaning that is generally understood by a person of ordinary skill in the art.

Throughout the disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

The expression "configured to (or set to)" used herein may be used interchangeably, according to context, with the expression such as "suitable for," "having the capacity to," "designed to," "adapted to," "made to," or "capable of." The term "configured to (or set to)" may not necessarily mean only "specifically designed to" in terms of hardware. Instead, the expression "a system configured to" may mean, in some contexts, the system being "capable of," together with other devices or components. For example, the expression "a processor configured to (or set to) perform A, B, and C" may mean a dedicated processor (e.g., an embedded processor) for performing corresponding operations or a general-purpose processor (e.g., a central processing unit (CPU) or an application processor (AP)) capable of performing the corresponding operations by executing one or more software programs stored in a memory.

FIG. 1 is a conceptual diagram for describing an operation method of a communication device, according to an embodiment of the disclosure. In detail, FIG. 1 illustrates an embodiment in which, when the communication device 100 mounted on a host vehicle 10 suffers interference with respect to transmit and receive signals from a nearby vehicle 20, the communication device 100 performs data transmission and reception using a communication terminal 200 of the nearby vehicle 20 as a communication relay.

Referring to FIG. 1, the communication device 100 may be mounted on an external structure of the host vehicle 10 or located in the external structure. In the embodiment shown in FIG. 1, the communication device 100 may be disposed on a metal structure constituting a roof of the host vehicle 10. The communication device 100 may include a millimeter wave (mmWave) antenna module (e g, mmWave antenna module 110 of FIG. 2) and a modulator-demodulator (modem) (e.g., modem 120 of FIG. 2).

The nearby vehicle 20 may be a vehicle stopped or driving in a vicinity of the host vehicle 10. In the embodiment shown in FIG. 1, the nearby vehicle 20 may be a vehicle with a larger body and a higher ride height than a general passenger car, but is not limited thereto. For example, the nearby vehicle 20 may be a public transportation vehicle such as a bus or a commercial vehicle such as a truck. The communication terminal 200 may be mounted on the nearby vehicle 20. In an embodiment, the communication terminal 200 may perform data communication with a base station 1 via mmWave communication.

In the embodiment shown in FIG. 1, the communication device 100 of the host vehicle 10 may perform mmWave communication by matching a beam direction with that of the base station 1. In an embodiment, the communication device 100 may perform beamforming in real time to match its beam direction with a beam direction of the base station 1. A beam from the communication device 100 toward the base station 1 may be blocked by the nearby vehicle 20, and signal interference may occur. In this case, the quality of a communication channel generated between the communication device 100 and the base station 1 may deteriorate.

When signal interference by the nearby vehicle 20 occurs, the communication device 100 may request the communication terminal 200 mounted on the nearby vehicle 20 to execute a communication relay communication relay function. The communication terminal 200 may receive a communication relay function execution request signal from the communication device 100 and transmit a communication relay function execution acceptance signal to the communication device 100. The communication device 100 and the communication terminal 200 may be connected to each other via a device-to-device (D2D) connection.

The communication device 100 may perform data communication with the base station 1 by using the communication terminal 200 mounted on the nearby vehicle 20 as a communication relay. In an embodiment, the communication device 100 may receive data that the communication terminal 200 receives from the base station 1 using mmWave communication in a downlink via the D2D connection, and transmit data to the base station 1 via an uplink of the communication terminal 200.

In vehicle-to-everything (V2X) communication or cellular V2X (C-V2X) communication, mmWave communication is used to achieve high data rates and low latency. In order for the host vehicle 10 supporting a mmWave communication function to communicate with the base station 1, a beam direction of signals transmitted and received via a mmWave antenna module installed in the host vehicle 10 needs to match a beam direction of a signals transmitted and received via an antenna of the base station 1. To efficiently perform data transmission and reception using the mmWave antenna module, the host vehicle 10 continuously checks surrounding signals even while moving or stationary, and performs beamforming to direct a beam toward the base station 1. In a mobile environment such as urban driving, directions of signals transmitted and received between an antenna of the host vehicle 10 and the base station 1 may change in real time, and signal interference may occur due to the nearby vehicle 20 or obstacles such as buildings. In particular, a general passenger car with a low body is more likely to suffer signal interference than vehicles with a high body, such as trucks or buses. In this case, the quality of a mmWave communication channel between the communication device 100 mounted on the host vehicle 10 and the base station 1 may deteriorate.

In the embodiment shown in FIG. 1, in a case where interference occurs in mmWave communication signals due to the nearby vehicle 20, and the quality of a communication channel deteriorates, the communication device 100 may request the communication terminal 200 to perform a communication relay function and perform data transmission and reception with the base station 1 by using the communication terminal 200 as a communication relay. Therefore, the communication device 100 of the disclosure may maintain a communication connection with the base station 1 without interruption of the communication channel, prevent data loss, and improve the quality of the communication channel.

Figure 2:
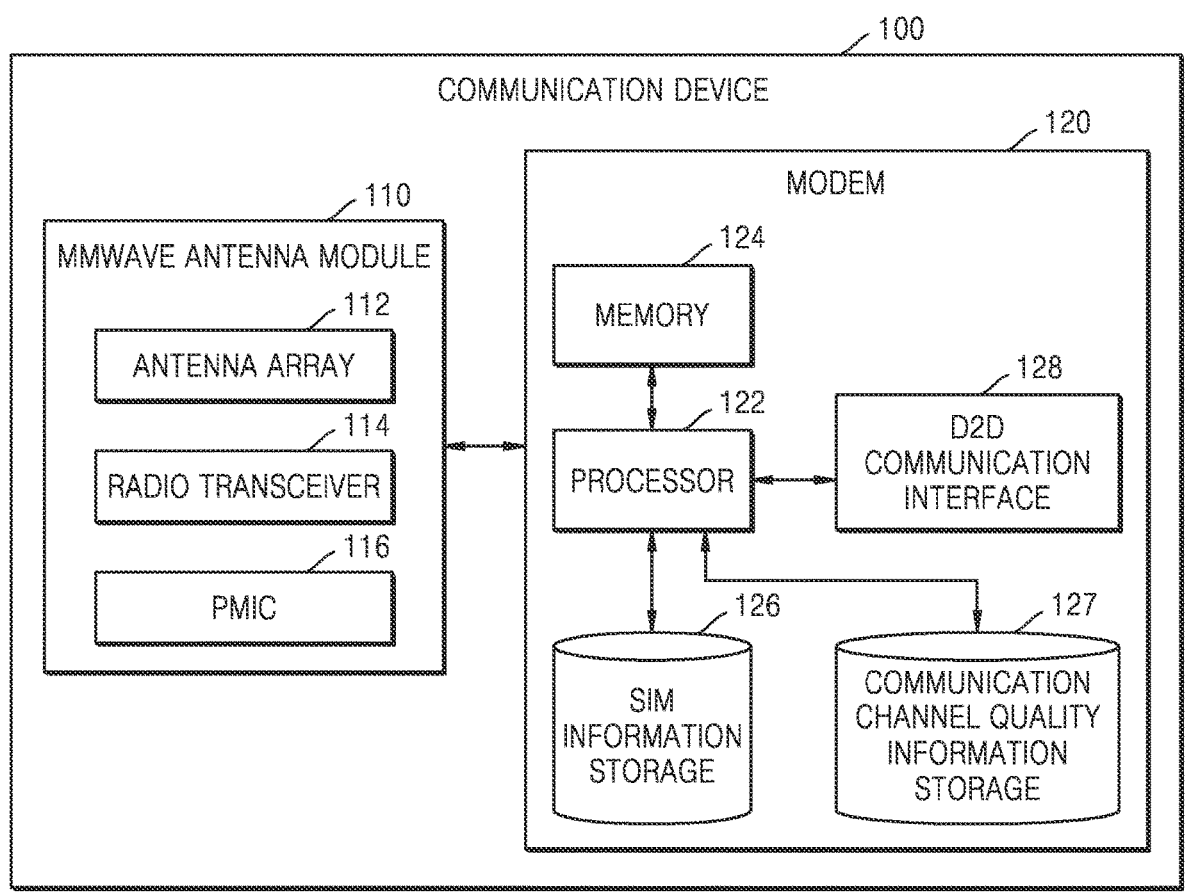
FIG. 2 is a block diagram illustrating components of a communication device according to an embodiment of the disclosure.

FIG. 2 is a block diagram illustrating components of a communication device according to an embodiment of the disclosure.

The communication device 100 may be mounted on an external structure of the vehicle (e.g., host vehicle 10 of FIG. 1). In an embodiment, the communication device 100 may be disposed on a metal structure constituting the roof of the host vehicle 10. However, the disclosure is not limited thereto, and the communication device 100 may also be disposed on a bonnet, bumper, pillar, or trunk of the host vehicle 10.

Referring to FIG. 2, the communication device 100 may include a mmWave antenna module 110 and a modem 120.

The mmWave antenna module 110 may perform a connection with the base station 1 via mmWave communication and transmit and receive data via a communication channel generated with the base station 1. The mmWave antenna module 110 may include an antenna array 112, a radio transceiver 114, and a power management integrated circuit (PMIC) 116. Although not shown in the drawings, the mmWave antenna module 110 may further include at least one of a radio frequency IC (RFIC), a power amplifier, an attenuator, a converter, and a temperature sensor. The at least one of the RFIC, the power amplifier, the attenuator, the converter, and the temperature sensor may be mounted on a printed circuit board (PCB) and electrically and/or physically connected to each other.

The antenna array 112 may be implemented as a phased array antenna configured to control a direction of a main beam by adjusting phase delays of transmission signals applied to a plurality of antenna elements using data regarding phase values received from the modem 120. The antenna array 112 may be configured as a package including a plurality of antenna elements arranged in an array. The plurality of antenna elements may be a mmWave antenna capable of transmitting and receiving data in a frequency range from 30 gigahertz (GHz) to 300 GHz. The plurality of antenna elements may include, for example, a total of 16 patch antennas arranged in a 4×4 array, and the mmWave antenna module 110 may include a total of 4 antenna arrays 112. The mmWave antenna module 110 may include a total of 64 antenna elements arranged in an 8×8 array, but this is merely an example and is not limited to the above specified number.

Each of the plurality of antenna elements included in the antenna array 112 receives a radio signal having a certain magnitude (or gain), a certain phase, and a certain frequency from the radio transceiver 114, and emits a radio wave corresponding to the input radio signal. In an embodiment, each of the plurality of antenna elements included in the antenna array 112 may receive a radio wave corresponding to a certain signal magnitude (or gain), a certain phase, and a certain frequency, and transmit a radio signal corresponding to the received radio wave to the radio transceiver 114.

The radio transceiver 114 may generate and/or process signals transmitted and received via the antenna array 112. Specifically, the radio transceiver 114 may generate a radio signal having a certain phase and a certain frequency. The radio signal generated by the radio transceiver 114 may be output via the antenna array 112. In addition, when a radio wave with a certain phase and a certain frequency is received by the antenna array 112, the radio transceiver 114 may receive and process a signal corresponding to the radio wave received by the antenna array 112.

In detail, the radio transceiver 114 may process a radio signal to have a certain phase and a certain frequency. Specifically, the radio transceiver 114 may perform transmit (Tx) beamforming to generate a radio signal with a certain gain, a certain phase, and a certain frequency for transmission of the radio signal. In addition, the radio transceiver 114 may perform receive (Rx) beamforming to receive and process a radio wave corresponding to a certain phase and a certain frequency for reception of a radio signal. Here, 'beamforming' may refer to an operation of forming a beam so that a beam having a specific shape is emitted or received. Specifically, when a plurality of antenna elements are arranged, beamforming may refer to an operation of controlling an overall radiation direction of a beam by adjusting phases of signals applied to the arranged antenna elements.

The PMIC 116 is a circuit configured to apply power to the mmWave antenna module 110, control the applied power, and detect overvoltage or undervoltage. In an embodiment, the PMIC 116 may include at least one of a voltage regulator, a surge protection circuit, a power sensing circuit, and an auxiliary power supply. The PMIC 116 may detect whether the mmWave antenna module 110 suffers from an overvoltage or an undervoltage by using the power sensing unit.

In an embodiment, the PMIC 116 may further include a power amplifier (PA). The PA may amplify the power of a transmission signal transmitted from the mmWave antenna module 110 to the base station (1 of FIG. 1).

The modem 120 is configured to monitor the quality of a communication channel connected to the base station 1 through the mmWave antenna module 110, and according to a monitoring result, request the communication terminal (e.g., the communication terminal 200 of FIG. 1) mounted on the nearby vehicle (20 of FIG. 1) to perform a communication relay function. The modem 120 may be electrically and/or physically connected to the mmWave antenna module 110 and control operations and/or functions of the mmWave antenna module 110. The modem 120 may include a processor 122, a memory 124, a subscriber identity module (SIM) information storage 126, and a D2D communication interface 128.

The processor 122 may execute one or more instructions of a program stored in the memory 124. The processor 122 may be composed of hardware components that perform arithmetic, logic, and input/output (I/O) operations, and signal processing. For example, the processor 122 may consist of, but is not limited to, at least one of a CPU, a microprocessor, a graphics processing unit (GPU), application specific integrated circuits (ASICs), digital signal processors (DSPs), digital signal processing devices (DSPDs), programmable logic devices (PLDs), and field programmable gate arrays (FPGAs). In an embodiment, the processor 122 may be configured as a communication processor (CP).

The memory 124 may include, for example, a non-volatile memory including at least one of a flash memory-type memory, a hard disk-type memory, a multimedia card micro-type memory, a card-type memory (e.g., a secure digital (SD) card or an extreme digital (XD) memory), read-only memory (ROM), electrically erasable programmable ROM (EEPROM), and PROM, and a volatile memory such as random access memory (RAM) or static RAM (SRAM).

The memory 124 may store instructions, data structures, and program code that are readable by the processor 122. In embodiments set forth below, the processor 122 may be implemented by executing instructions or code of a program stored in the memory 124.

In an embodiment, the processor 122 may execute program code or instructions stored in the memory 124 to control the D2D communication interface 128 to perform a connection with the communication terminal 200 mounted on the nearby vehicle 20 via D2D communication, transmit subscriber identity information (SII) stored in the SIM information storage 126 to the communication terminal 200, request the communication terminal 200 to perform a communication relay function with the base station 1, and transmit and receive data to and from the base station 1 by using the communication relay function performed by the communication terminal 200.

The D2D communication interface 128 is a communication module configured to perform a D2D communication connection without a server, a gateway, or other relay devices, and transmit and receive data via a D2D connection. The D2D communication interface 128 may perform a connection with another device and transmit and receive data by using at least one of the communication schemes including, for example, Wi-Fi direct, mobile Bluetooth™, long term evolution-D2D (LTE-D2D), and fifth generation (5G) D2D.

In an embodiment, the processor 122 may identify whether the communication terminal 200 capable of connecting via a D2D connection is mounted on the nearby vehicle 20 that is stopped or driving in a vicinity of the host vehicle 10. In an embodiment, the nearby vehicle 20 may be a single vehicle or a plurality of vehicles. In an embodiment, the processor 122 may identify whether the nearby vehicle 20 provides C-V2X services or includes the communication terminal 200 capable of connecting via Wi-Fi direct, Bluetooth™, LTE-D2D, etc.

In an embodiment, the processor 122 may identify whether the communication terminal 200 mounted on the identified nearby vehicle 20 is able to perform a relay function with the base station. In an embodiment, the processor 122 may receive information about a communication relay function from the communication terminal 200, and identify, based on the received information, whether the communication terminal 200 is able to perform a communication relay function. When there are a plurality of nearby vehicles 20, the processor 122 may receive, from each of a plurality of communication terminals 200 respectively included in the plurality of nearby vehicles 20, information about whether each of the plurality of communication terminals 200 is able to act as a communication relay, and identify, based on the received information, whether each of the plurality of communication terminals 200 is to perform a communication relay function. The 'communication relay function' refers to a function for relaying data exchanged by the communication terminal 200 with the base station via mmWave communication to another communication terminal or the communication device 100 connected via a D2D connection.

In an embodiment, the processor 122 may control the D2D communication interface 128 to perform a D2D connection with the communication terminal 200 identified as being able to perform the communication relay function.

In an embodiment, the processor 122 may control the D2D communication interface to transmit SII stored in the SIM information storage 126 to connected at least one communication terminal 200.

The SIM information storage 126 may store at least one of SII and subscriber terminal information (e.g., a device identifier (ID)). The SIM information storage 126 may encrypt at least one of the SII and the subscriber terminal information by using a data encryption method and store the encrypted information. Here, a 'subscriber' refers to a user for a network service provided by a communication service provider through SII uniquely assigned to a user of the communication device 100. 'SIT' may include at least one of an international mobile subscriber identity (IMSI), a temporary mobile subscriber identity (TMSI), an IC card ID (ICCID), a master key, and a globally unique temporary ID (GUTI). In an embodiment, the SIM information storage 126 may store at least one of a local area identity, an operator-specific emergency number, a short message service center (SMSC) number, a service provider network (SPN), service dialing numbers (SDN), advice-of-charge parameters, and value-added service applications.

The SIM information storage 126 may be configured as a SIM card that is physically inserted into the communication device 100 and is removable. However, the disclosure is not limited thereto, and the SIM information storage 126 may be configured in the form of an embedded SIM (eSIM). When the SIM information storage 126 is in the form of an eSIM, the SIM information storage 126 may be configured as a non-volatile memory. For example, the SIM information storage 126 may be configured as a non-volatile memory including at least one of a flash memory, a hard disk, ROM, EEPROM, and PROM.

The processor 122 may receive communication channel quality information from at least one communication terminal 200 respectively mounted on at least one nearby vehicle 20 connected thereto using a D2D communication method. Here, the 'communication channel quality information (in other words, channel quality indicator (CQI))' is an indicator indicating the quality of a communication channel generated between the at least one communication terminal 200 and the base station 1. The communication channel quality information may include, for example, at least one of strength information (received signal strength indicator (RSSI)) of a signal received by each of the at least one communication terminal 200 from the base station 1, reference signal received power (RSRP), signal-to-noise ratio (SNR) information, and bandwidth information of the communication channel.

In an embodiment, the processor 122 may store the communication channel quality information received from the at least one communication terminal 200 in a communication channel quality information storage 127. The processor 122 may generate a list of identification information (e.g., a terminal ID) of each of the at least one communication terminal 200 and communication channel quality information received from each of the at least one communication terminal 200 and store the list in the communication channel quality information storage 127.

The communication channel quality information storage 127 is a database for storing information about communication channel quality received from each of the at least one communication terminal 200. In an embodiment, the communication channel quality information storage 127 may be configured as a non-volatile memory. Non-volatile memory refers to a storage medium that can store and retain information even when power is not supplied and use the stored information again when power is supplied. For example, the communication channel quality information storage 127 may include at least one of a flash memory, a hard disk, a solid-state drive (SSD), a multimedia card micro-type memory, a card-type memory (e.g., an SD card or an XD memory), ROM, a magnetic memory, a magnetic disk, and an optical disk.

Although FIG. 2 shows that the communication channel quality information storage 127 is a separate component other than the memory 124 of the modem 120, the disclosure is not limited thereto. In an embodiment, the communication channel quality information storage 127 may be included in memory 124.

Alternatively, the communication channel quality information storage 127 may be included in another device, an external database, or a server as a component not included in the communication device 100. In this case, the communication device 100 may connect with the communication channel quality information storage 127 included in another device, an external database, or a server via the modem 120, and access or read data stored in the communication channel quality information storage 127.

In an embodiment, the processor 122 may determine, based on communication channel quality information pre-stored in the communication channel quality information storage 127, a communication terminal from which to request execution of a communication relay function among the at least one communication terminal 200. For example, when the communication device 100 is connected to the plurality of communication terminals, the processor 122 may receive pieces of communication channel quality information from the plurality of communication terminals, and select a communication terminal having a best channel quality based on the pieces of communication channel quality information. For example, when the communication device 100 is connected to one communication terminal 200, the processor 122 may determine the connected communication terminal 200 as a communication terminal from which to request execution of the communication relay function.

In an embodiment, the processor 122 may receive driving information including location information, driving direction information, destination information, and route information from each of at least one nearby vehicle via the D2D communication interface 128. The processor 122 may select a communication terminal from among at least one communication terminal based on at least one of the driving information and the communication channel quality information. In an embodiment, the processor 122 may obtain location coordinate value information of the host vehicle 10 from a global positioning system (GPS) sensor included in a telematic control unit (TCU) of the host vehicle 10, compare the obtained location coordinate value information of the vehicle with the driving information received from the at least one nearby vehicle, and select a communication terminal based on a comparison result. For example, the processor 122 may compare a driving direction, a destination, or a route of the host vehicle 10 with a driving direction, a destination, or a route of each of the at least one nearby vehicle, and select a communication terminal of a vehicle having a driving direction, a destination, or a route that is most similar to that of the host vehicle 10.

The processor 122 may request the selected communication terminal to perform a communication relay function. In an embodiment, the processor 122 may monitor the quality of a communication channel between the base station 1 and the communication device 100, and when the monitored quality of the communication channel is less than or equal to a preset threshold value, or a communication connection with the base station 1 is released, the processor 122 may request the communication terminal to perform a communication relay function. In an embodiment, the processor 122 may control the D2D communication interface 128 to transmit a signal for requesting execution of a communication relay function to the communication terminal.

The processor 122 may receive a communication relay function acceptance signal from the communication terminal via the D2D communication interface 128. Upon receiving the communication relay function acceptance signal, the processor 122 may transmit and receive data to and from the base station 1 by using the communication terminal as a communication relay. In this case, the communication device 100 becomes a master device, and the communication terminal 200 connected to the communication device 100 to perform the communication relay function becomes a slave device. The slave device may transmit and receive data to and from the base station 1 via mmWave communication by using SII received from the communication device 100 as a master device. In this case, the user of the communication device 100 is charged a fee for data transmitted and received by the slave device to and from the base station 1 according to the SII for the communication device 100 as the master device. The slave device may transmit and receive data exchanged with the base station 1 to and from the communication device 100 as the master device by using a D2D communication method.

Connections and data transmission and reception among the master device, the slave device, and the base station 1 will be described in detail with reference to FIG. 5.

The processor 122 may continuously monitor quality information of a communication channel generated between the communication device 100 and the base station 1. In an embodiment, the processor 122 may monitor quality of the communication channel between the communication device 100 and the base station 1 even while using the communication terminal as a communication relay. The processor 122 may compare quality information of a first communication channel between the communication device 100 and the base station 1, which is obtained via monitoring, with quality information of a second communication channel generated between the base station 1 and a communication terminal performing a communication relay function. The processor 122 may determine whether to release a D2D connection with the communication terminal.

In an embodiment, when the quality of the first communication channel is superior to that of the second communication channel, i.e., when the first communication channel through which the communication device 100 directly connects to the base station 1 has a better quality than the second communication channel between the communication terminal as a communication relay device and the base station 1, the processor 122 may release a D2D connection with the communication terminal. In this case, the processor 122 may control the mmWave antenna module 110 to directly connect to the base station 1 via mmWave communication. An embodiment of disconnection from the communication terminal and direct connection with the base station 1 will be described in detail with reference to FIGS. 6 and 7.

In an embodiment, the processor 122 may receive, via the D2D communication interface 128, a relay function execution request signal from a communication terminal mounted on a nearby vehicle. In response to the received relay function execution request signal, the processor 122 may perform a relay function for data transmission and reception between the base station 1 and the nearby vehicle. In other words, the communication device 100 is used as a communication relay to perform a relay function for data transmission and reception between the communication terminal and the base station 1. An embodiment in which the communication device 100 performs a communication relay function will be described in detail with reference to FIG. 8.

In an embodiment of the disclosure, at least one of the operations performed by the processor 122 may be performed using artificial intelligence (AI) technology. The at least one operation performed using AI technology will be described in detail below with reference to FIG. 9.

Figure 3:
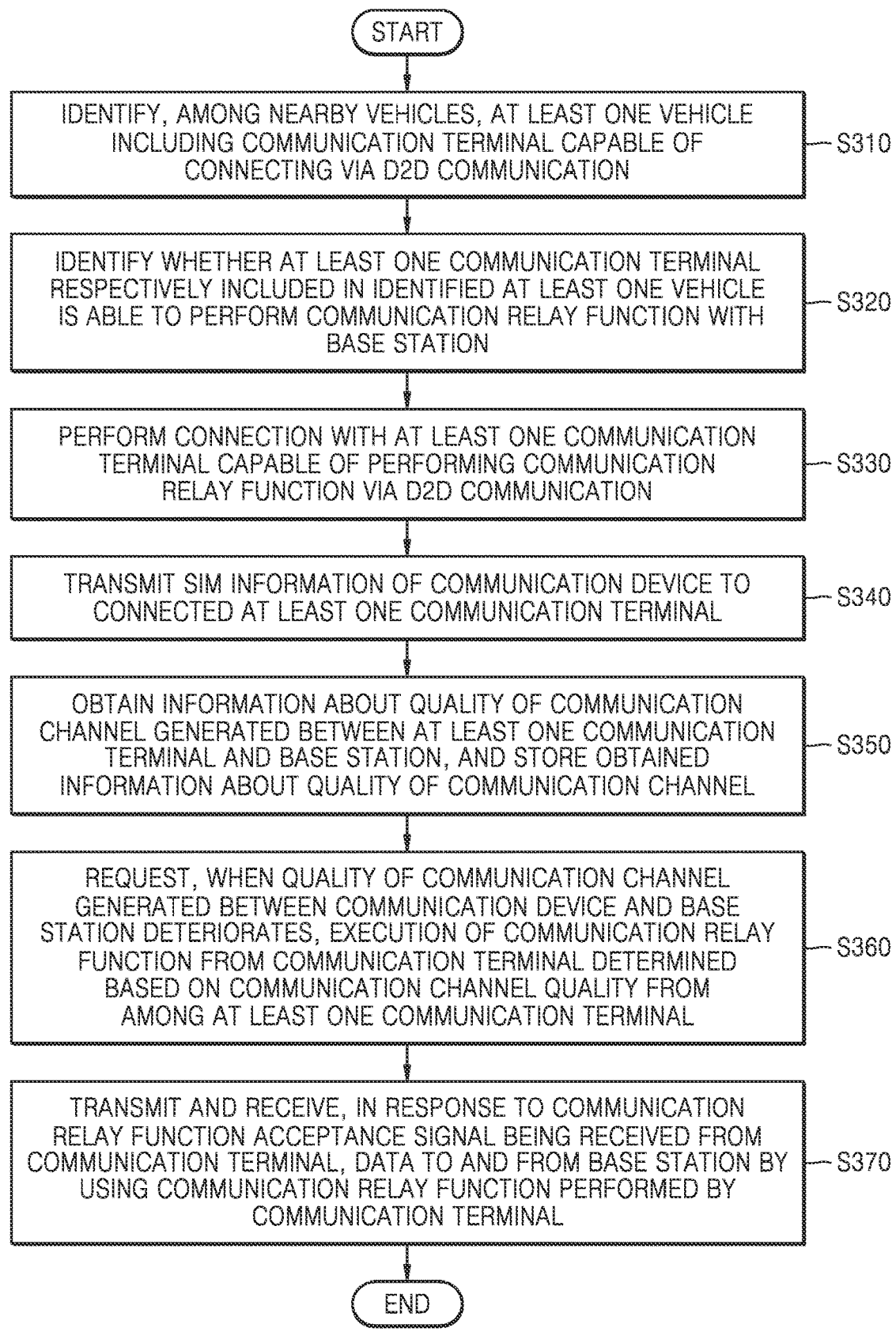
FIG. 3 is a flowchart of an operation method of a communication device, according to an embodiment of the disclosure.

FIG. 3 is a flowchart of an operation method of a communication device, according to an embodiment of the disclosure.

In operation 5310, the communication device 100 identifies, among nearby vehicles, at least one vehicle including a communication terminal capable of connecting via D2D communication. A nearby vehicle refers to a vehicle that is stopped or driving in the vicinity of the host vehicle (10 of FIG. 1) on which the communication device is mounted. The nearby vehicle may be a single vehicle or a plurality of vehicles. The communication device 100 may identify a communication terminal capable of connecting via a D2D connection from among communication terminals respectively included in the nearby vehicles. In an embodiment, the communication device 100 may identify whether a nearby vehicle provides C-V2X services or includes a communication terminal capable of connecting via Wi-Fi direct, Bluetooth™, LTE-D2D, etc.

In operation 5320, the communication device 100 identifies whether at least one communication terminal respectively included in the identified at least one vehicle is able to perform a relay function with a base station. In an embodiment, the communication device 100 may receive information about the relay function from the at least one communication terminal included in the identified at least one vehicle, and identify, based on the received information, whether each of the at least one communication terminal is able to perform a communication relay function. The 'communication relay function' refers to a function for relaying data exchanged by the at least one communication terminal with the base station via mmWave communication to another communication terminal connected via a D2D connection.

In operation 5330, the communication device 100 performs a connection with at least one communication terminal, which is capable of performing the relay function, via the D2D communication. The communication device 100 may perform a D2D connection with the at least one communication terminal by using at least one of the communication schemes including, for example, Wi-Fi direct, mobile Bluetooth™, LTE-D2D, and 5G D2D.

In operation 5340, the communication device 100 transmits SIM information to the connected at least one communication terminal. The SIM information may include at least one of SII and subscriber terminal information (e.g., a device ID). The communication device 100 may transmit SII of a SIM to the connected at least one communication terminal.

In an embodiment, the communication device 100 may transmit SII to the at least one communication terminal in the form of an eSIM.

In operation 5350, the communication device 100 obtains information about the quality of a communication channel generated between the at least one communication terminal and the base station, and stores the obtained information about the quality of the communication channel. Here, 'communication channel quality information (in other words, CQI)' is an indicator indicating the quality of the communication channel generated between the at least one communication terminal and the base station. The communication channel quality information may include, for example, at least one of strength information (RSSI) of a signal received by each of the at least one communication terminal from the base station 1, RSRP, SNR information, and bandwidth information of the communication channel. In an embodiment, the communication device 100 may receive, via D2D communication, the communication channel quality information from the at least one communication terminal included in the at least one vehicle.

The communication device 100 may store the communication channel quality information received from the at least one communication terminal. In an embodiment, the communication device 100 may include the communication channel quality information storage (127 of FIG. 2) for storing information about communication channel quality of each of the at least one communication terminal.

In operation 5360, when the quality of a communication channel generated between the communication device 100 and the base station deteriorates, the communication device 100 requests execution of a communication relay function from a communication terminal determined based on communication channel quality from among the at least one communication terminal. In an embodiment, the communication device 100 may monitor the quality of a communication channel through which it connects to the base station, and when the monitored quality of the communication channel is less than or equal to a preset threshold value, or a communication connection with the base station is released, the communication device 100 may request a communication terminal connected via the D2D communication to perform a communication relay function.

In an embodiment, the communication device 100 may select one of the at least one communication terminal and transmit a communication relay function execution request signal to the selected communication terminal. In an embodiment, the processor 122 may determine a communication terminal from which to request execution of a communication relay function among the at least one communication terminal, based on communication channel quality information of the at least one communication terminal, which is prestored in the communication channel quality information storage 127. A specific embodiment in which the communication device 100 determines a communication terminal will be described in detail with reference to FIG. 4. The communication device 100 may transmit a communication relay function execution request signal to a communication terminal by using a D2D communication method.

In operation 5370, in response to a communication relay function acceptance signal being received from the communication terminal, the communication device 100 may transmit and receive data to and from the base station by using the communication relay function performed by the communication terminal. In an embodiment, the communication device 100 may transmit and receive data to and from the base station by using the communication terminal as a communication relay. In this case, the communication device 100 becomes a master device, and the communication terminal connected to the communication device 100 to perform the communication relay function becomes a slave device. In an embodiment, the communication device 100 as a master device may receive data that a slave device receives from the base station using mmWave communication in a downlink via a D2D communication connection, and transmit data to the base station via an uplink of the slave device.

Figure 4:
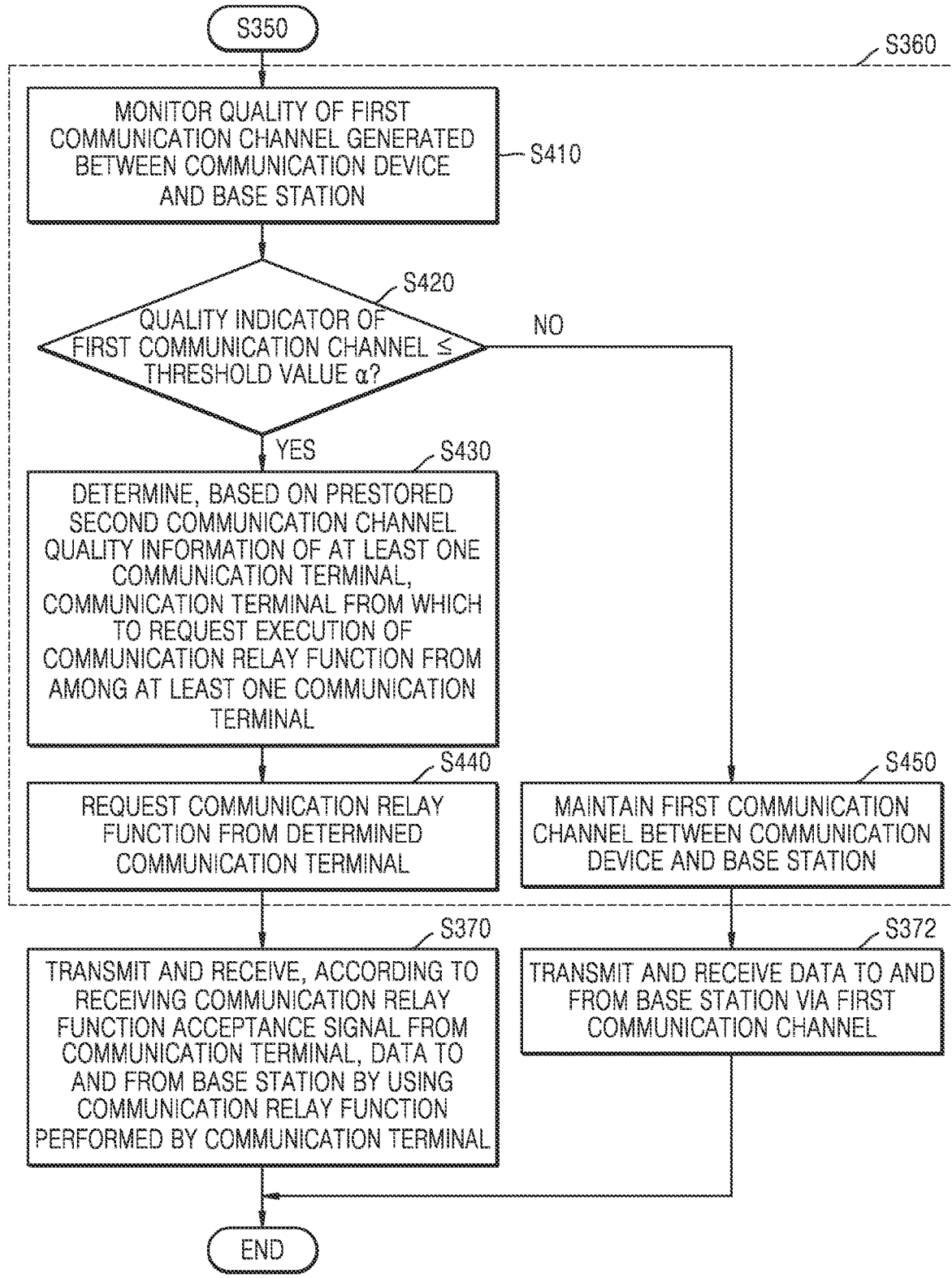
FIG. 4 is a flowchart of an operation method of a communication device, according to an embodiment of the disclosure.

FIG. 4 is a flowchart of an operation method of a communication device, according to an embodiment of the disclosure.

Operation 5410 shown in FIG. 4 may be performed after operation 5350 shown in FIG. 3 is performed. Operations 5410, 5420, 5430, 5440, and 5450 shown in FIG. 4 are detailed operations of operation 5360 shown in FIG. 3.

Referring to FIG. 4, in operation 5410, the communication device 100 monitors the quality of a first communication channel generated with the base station. In an embodiment, the communication device 100 may monitor the quality of the first communication channel generated with the base station via mmWave communication. The communication device 100 may obtain first communication channel quality information (in other words, CQI) by monitoring, for example, at least one of strength information (RSSI) of a signal received via the first communication channel generated with the base station, RSRP, SNR information, and bandwidth information of the communication channel.

In operation 5420, the communication device 100 may determine whether a quality indicator of the first communication channel is less than or equal to a preset threshold value a. In an embodiment, the communication device 100 may compare a numerical value indicating at least one indicator from among RSSI, RSRP, and SNR with the preset threshold value a and determine whether the value of the indicator is less than or equal to the threshold value a.

When the value of the quality indicator of the first communication channel is less than or equal to the threshold value a, at operation 5430, the communication device 100 determines, based on prestored second communication channel quality information of the at least one communication terminal, a communication terminal from which to request execution of a communication relay function from among the at least one communication terminal. In an embodiment, when the communication device 100 is connected to a plurality of communication terminals, the communication device 100 may receive pieces of second communication channel quality information from the plurality of communication terminals, and select a communication terminal having a best channel quality based on the pieces of second communication channel quality information. Here, the 'second communication channel quality information' refers to quality information of a communication channel generated between each of the plurality of communication terminals and the base station.

In another embodiment, when the communication device 100 is connected to one communication terminal, the communication device 100 may determine the connected communication terminal as a communication terminal from which to request execution of a communication relay function.

In an embodiment, the communication device 100 may receive driving information including location information, driving direction information, destination information, and route information from at least one nearby vehicle. In an embodiment, the communication device 100 may receive, by using a D2D communication method, driving information of a nearby vehicle from at least one communication terminal respectively included in the at least one nearby vehicle. In an embodiment, the communication device 100 may select a communication terminal from among the at least one communication terminal, based on at least one of driving information and second communication channel quality information.

In an embodiment, the communication device 100 may obtain location coordinate value information of the host vehicle 10 from a GPS sensor included in a TCU of the host vehicle 10. In an embodiment, the communication device 100 may compare the obtained location coordinate value information of the vehicle with the driving information received from the at least one nearby vehicle, and select a communication terminal based on a comparison result. For example, the communication device 100 may compare a driving direction, a destination, or a route of the host vehicle 10 with a driving direction, a destination, or a route of each of the at least one nearby vehicle, and select a communication terminal of a vehicle having a driving direction, a destination, or a route that is most similar to that of the host vehicle 10.

The communication device 100 may determine the selected communication terminal as a communication terminal from which to request execution of a communication relay function.

In operation 5440, the communication device 100 requests the communication relay function from the determined communication terminal. In an embodiment, the communication device 100 may transmit a communication relay function execution request signal to the determined communication terminal by using the D2D communication method.

In operation 5370, in response to a communication relay function acceptance signal being received from the communication terminal, the communication device 100 may transmit and receive data to and from the base station by using the communication relay function performed by the communication terminal. Because operation 5370 is the same as operation 5370 described with reference to FIG. 3, a description thereof will be omitted here.

When the value of the quality indicator of the first communication channel exceeds the threshold value a at operation 5450, i.e., when the quality of the first communication channel is excellent, the communication device 100 may maintain the first communication channel with the base station.

In operation 5372, the communication device 100 transmits and receives data to and from the base station via the first communication channel.

Figure 5:
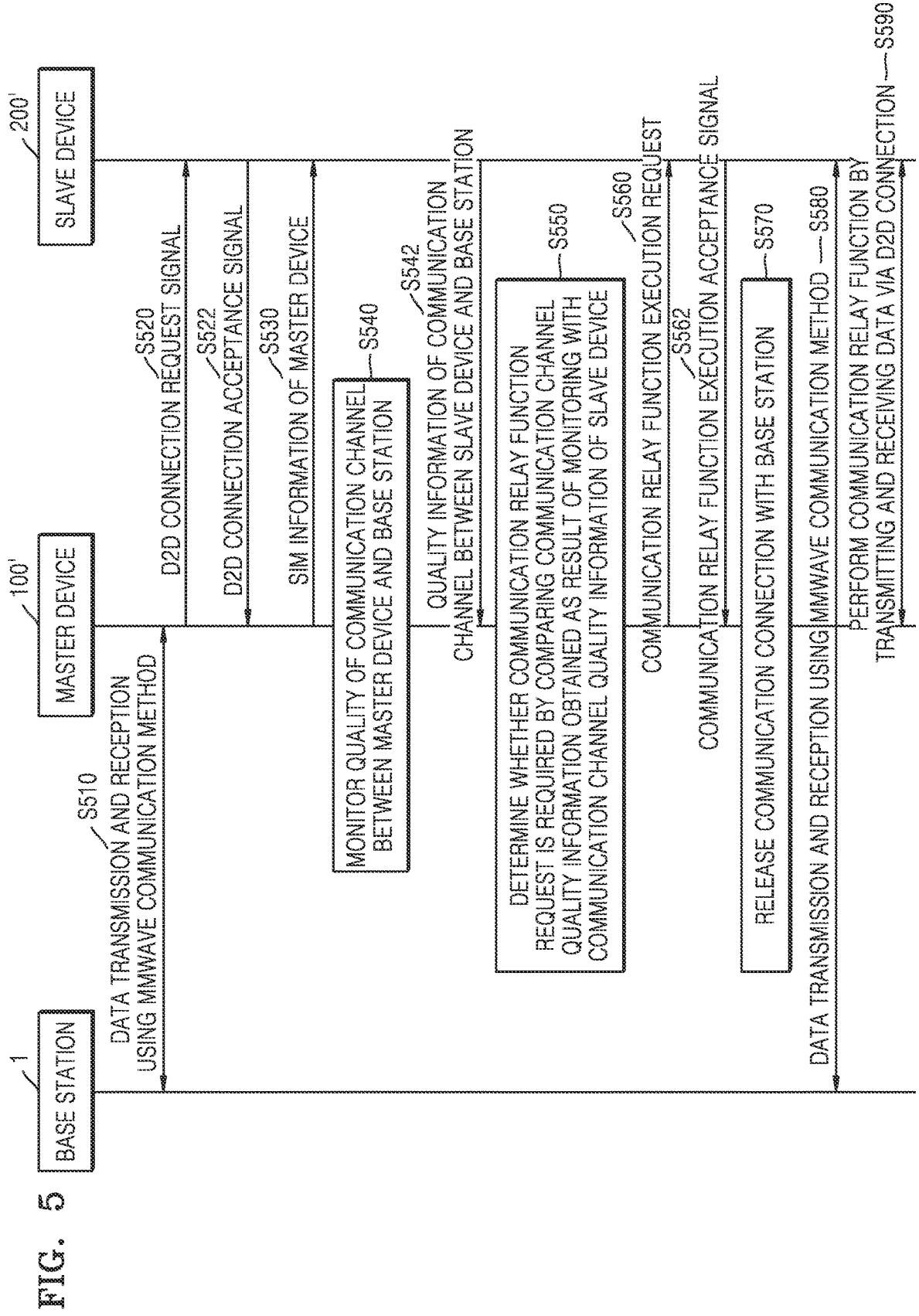
FIG. 5 is a flowchart for describing an operation method of a master device, a slave device, and a base station, according to an embodiment of the disclosure.

FIG. 5 is a flowchart for describing an operation method of a master device (e.g., the communication device 100), a slave device (e.g., the communication terminal 200), and a base station 1, according to an embodiment of the disclosure. A master device 100' shown in FIG. 5 may be the same as the communication device 100 shown in FIG. 1, and a slave device 200' may have the same configuration as the communication terminal 200 of FIG. 1 connected to the communication device 100 using a D2D communication method. When the communication device 100 is connected to the communication terminal 200 and uses the communication terminal 200 as a communication relay, the communication device 100 becomes a master device, and the communication terminal 200 becomes a slave device.

Referring to FIG. 5, in operation 5510, a master device 100' performs data transmission and reception with a base station 1 by using an mmWave communication method.

In operation 5520, the master device 100' transmits a D2D connection request signal to the slave device 200'. In an embodiment, the master device 100' may transmit, together with the D2D connection request signal, device identification information (e.g., a device ID) and device location information (e.g., GPS information) to the slave device 200'. The master device 100' may transmit the D2D connection request signal to the slave device 200' by using at least one of the communication schemes including, for example, Wi-Fi direct, mobile Bluetooth™, LTE-D2D, and 5G D2D.

In operation 5522, the slave device 200' transmits a D2D connection acceptance signal to the master device 100'. After the master device 100' receives the D2D connection acceptance signal from the slave device 200', the master device 100' and the slave device 200' may be connected to each other using a D2D connection method.

In operation 5530, the master device 100' transmits SIM information to the slave device 200'. In an embodiment, the master device 100' may transmit SII stored in the SIM information storage (e.g., the SIM information storage 126 of FIG. 2) to the slave device 200'. In an embodiment, the master device 100' may transmit SII stored in an eSIM to the slave device 200'. The slave device 200' may transmit, to the master device 100', an acknowledgement signal confirming that the SIM information has been received.

In operation 5540, the master device 100' monitors quality of a communication channel generated with the base station. In an embodiment, the master device 100' may monitor the quality of a communication channel generated with the base station via mmWave communication. The master device 100' may obtain communication channel quality information (in other words, CQI) by monitoring, for example, at least one of strength information (RSSI) of a signal received via the communication channel generated with the base station, RSRP, SNR information, and bandwidth information of the communication channel.

In an embodiment, the master device 100' may transmit the communication channel quality information obtained as a result of monitoring to the slave device 200'.

In operation 5542, the slave device 200' transmits, to the master device 100', quality information of a communication channel generated between the slave device 200' and the base station. The slave device 200' may transmit the quality information of the communication channel to the master device 100' connected through a D2D communication method.

In operation 5550, the master device 100' determines whether a communication relay function request is required by comparing the communication channel quality information obtained as a result of the monitoring with the communication channel quality information received from the slave device 200'. The master device 100' may compare a first communication channel quality obtained as a result of the monitoring performed in operation 5540 with a second communication channel quality for the slave device 200' received in operation 5542, and when the second communication channel quality is superior to the first communication channel quality as a comparison result, the master device 100' may determine that the communication relay function request is required. In an embodiment, the master device 100' may determine that the communication relay function request is required when the first communication channel quality obtained as a result of the monitoring is less than or equal to a preset threshold value, or when a communication connection with the base station is released.

In operation 5560, the master device 100' requests the slave device 200' to perform a communication relay function.

In operation 5562, the slave device 200' transmits a communication relay function execution acceptance signal to the master device 100'.

In operation 5570, the master device 100' releases a communication connection with the base station. The master device 100' maintains mmWave communication by continuously matching a beam direction with that of a base station from when performing operation 5510, but releases the connection in operation 5570.

In operation 5580, the slave device 200' transmits and receives data to and from the base station using the mmWave communication method.

In operation 5590, the slave device 200' performs the communication relay function by transmitting and receiving data to and from the master device 100' via D2D connection. In an embodiment, the slave device 200' may transmit and receive data to and from the base station via mmWave communication by using SII received from the master device 100'. In this case, a user of the master device 100' is charged a fee for data transmitted and received by the slave device to and from the base station, according to the SII for the master device 100'. The slave device 200' may transmit and receive data exchanged with the base station to and from the master device 100' by using the D2D communication method.

In response to the communication relay function execution acceptance signal being received, the master device 100' may transmit and receive data to and from the base station by using the slave device 200' as a communication relay.

Figure 6:
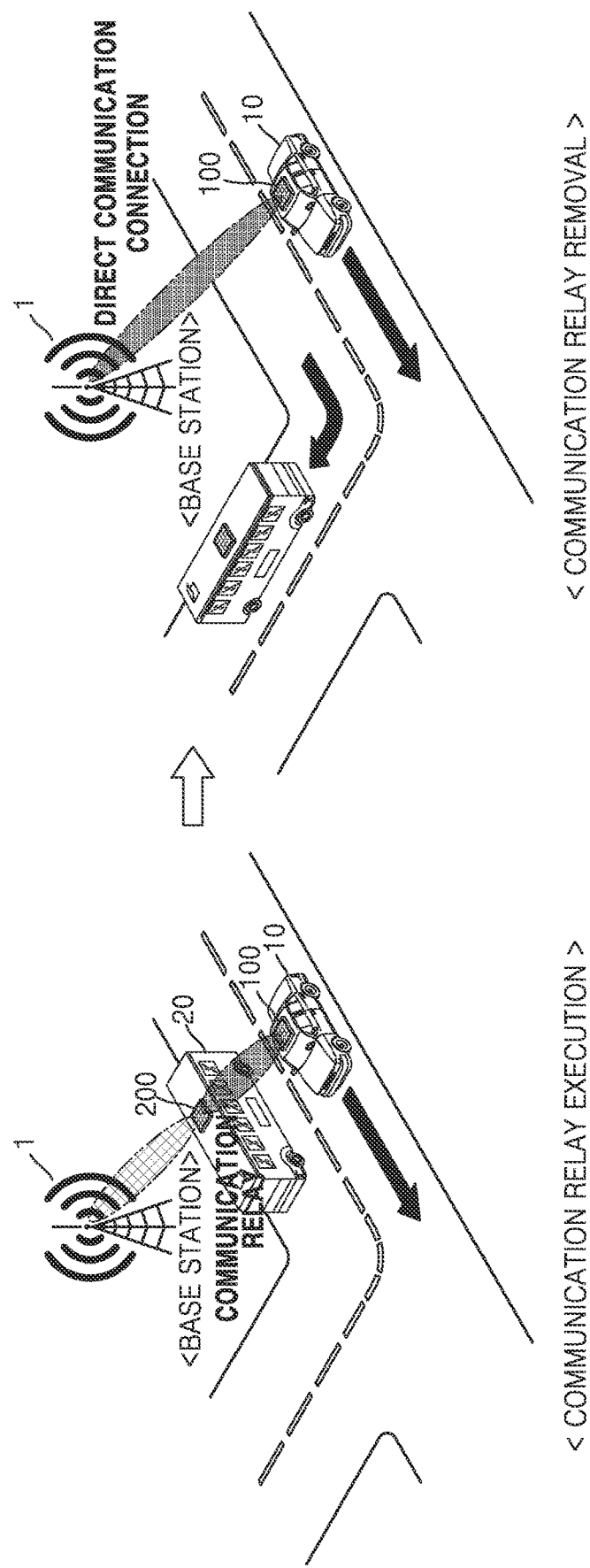
FIG. 6 is a conceptual diagram for describing an operation method of a communication device, according to an embodiment of the disclosure.

FIG. 6 is a conceptual diagram for describing an operation method of a communication device, according to an embodiment of the disclosure.

Referring to FIG. 6, the communication device 100 mounted on a host vehicle 10 may transmit and receive data to and from a base station 1 by using a communication terminal 200 mounted on a nearby vehicle 20 as a communication relay. The communication device 100 may monitor in real time the quality of a communication channel generated with the base station 1. The communication device 100 may compare the quality of the communication channel, which is obtained as a result of the monitoring, with the quality of a communication channel generated between the communication terminal 200 performing a communication relay function and the base station 1.

When the quality of the communication channel between the communication device 100 and the base station 1, which is obtained as a result of the monitoring, is superior to the quality of the communication channel between the communication terminal 200 and the base station 1, the communication device 100 may release a connection for communication relay with the communication terminal 200, and directly connect to the base station 1 via mmWave communication. In an embodiment, the communication device 100 may release a communication relay connection with the communication terminal 200 when the quality of the communication channel obtained as a result of the monitoring is greater than or equal to a preset threshold value. The communication device 100 may directly transmit and receive data to and from the base station 1 by using a mmWave communication method.

The communication device 100 may obtain location information and driving information of each of the host vehicle 10 and the nearby vehicle 20. In an embodiment, the modem (e.g., the modem 120 of FIG. 2) of the communication device 100 may receive, from a TCU of the host vehicle 10, location information of the host vehicle 10 and driving information including navigation destination information, route information, etc. of the host vehicle 10, which are obtained using a GPS sensor of the host vehicle 10. In an embodiment, the host vehicle 10 may detect location information and a driving direction of the nearby vehicle 20 by using at least one of, for example, a camera, a laser sensor, and a lidar sensor, and provide the location information and driving direction information of the nearby vehicle 20 to the communication device 100. The modem 120 of the communication device 100 may receive driving information including at least one of navigation destination information and route information of the nearby vehicle 20 from the communication terminal 200 of the nearby vehicle 20 via the D2D communication interface (128 of FIG. 2).

The communication device 100 may release the communication relay connection with the communication terminal 200, based on the location information and driving information of the host vehicle 10 and the location information and driving information of the nearby vehicle 20. For example, when the nearby vehicle 20 turns right and the host vehicle 10 drives straight, i.e., their driving directions are not the same, the modem 120 of the communication device 100 may control the D2D communication interface 128 to release a connection for a communication relay function with the communication terminal 200 of the nearby vehicle 20, based on the location information and driving information provided from the TCU.

Figure 7:
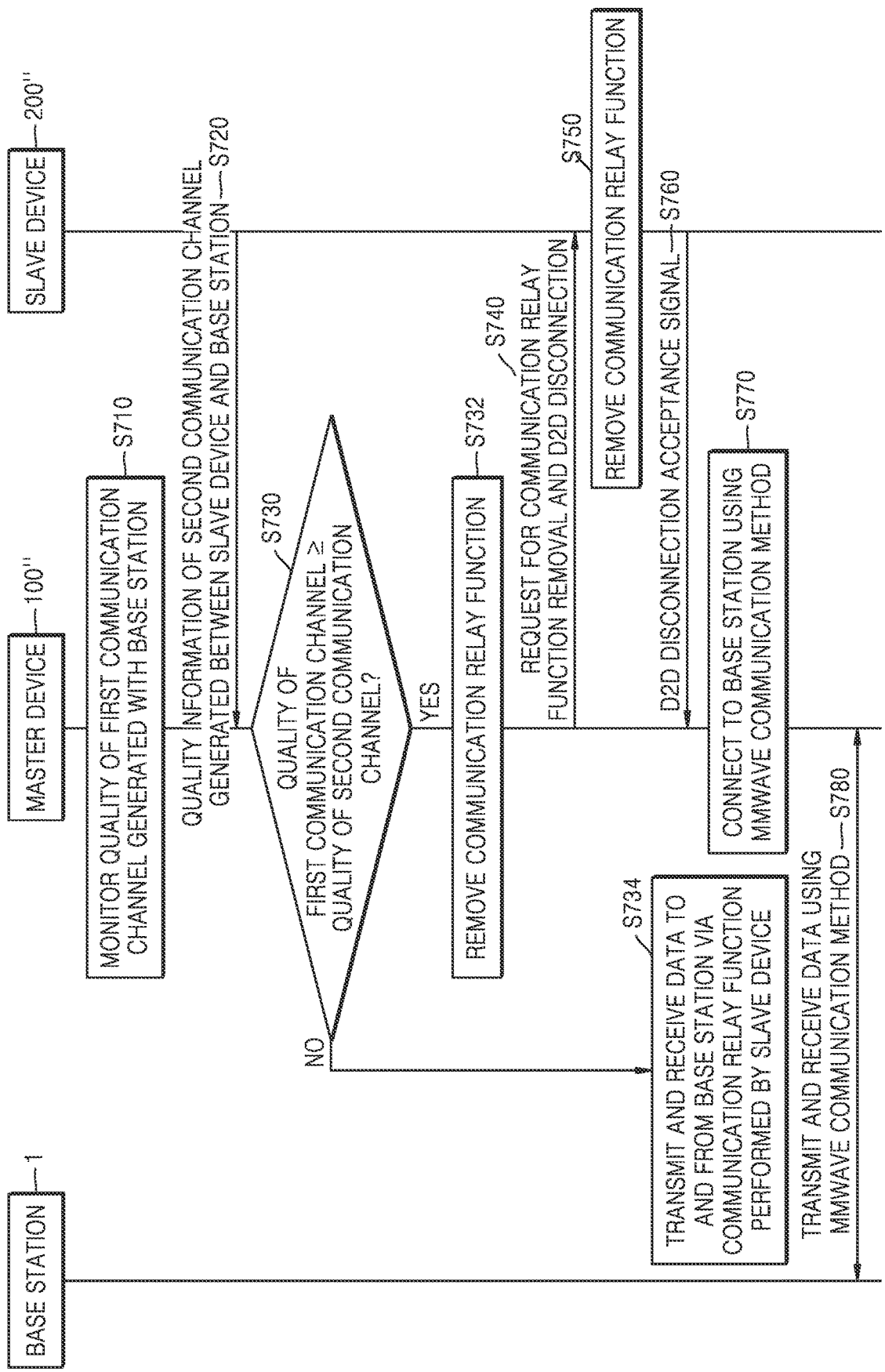
FIG. 7 is a flowchart for describing operation methods of a master device, a slave device, and a base station, according to an embodiment of the disclosure.

FIG. 7 is a flowchart for describing operation methods of a master device, a slave device, and a base station 1, according to an embodiment of the disclosure. A master device 100" shown in FIG. 7 is the same as the communication device 100 shown in FIG. 6, and a slave device 200" may have the same configuration as the communication terminal 200 of FIG. 6 connected to the communication device 100 using a D2D communication method. When the communication device 100 is connected to the communication terminal 200 and uses the communication terminal 200 as a communication relay, the communication device 100 becomes a master device, and the communication terminal 200 becomes a slave device.

Referring to FIG. 7, in operation 5710, the master device 100" monitors quality of a first communication channel generated with the base station 1. In an embodiment, the master device 100" may monitor the quality of the first communication channel in real time. The master device 100" may monitor at least one of, for example, strength information (RSSI) of a signal received by the master device 100" from the base station 1, SNR information for the first communication channel, and bandwidth information of the first communication channel.

In operation 5720, the slave device 200" transmits, to the master device 100", quality information of a second communication channel generated between the slave device 200" and the base station 1. In an embodiment, the slave device 200" may transmit the quality information of the second communication channel to the master device 100" by using a D2D communication method.

In operation 5730, the master device 100" may compare the quality of the first communication channel with the quality of the second communication channel.

When the quality of the first communication channel is superior to the quality of the second communication channel, at operation 5732, the master device 100" may release a connection for a communication relay function with the slave device 200".

In operation 5740, the master device 100" transmits, to the slave device 200", signals for requesting removal of the communication relay function and release of a D2D connection.

In operation 5750, in response to a communication relay function removal request signal being received, the slave device 200" may remove the communication relay function. In an embodiment, in response to a D2D disconnection request signal being received from the master device 100", the slave device 200" may release the D2D connection with the master device 100".

In operation 5760, the slave device 200" transmits a D2D disconnection acceptance signal to the master device 100".

In operation 5770, the master device 100" directly connects to the base station 1 by using an mmWave communication method.

In operation 5780, the master device 100" transmits and receives data to and from the base station 1 via mmWave communication for connecting it with the base station 1.

When the quality of the first communication channel is not superior to the quality of the second communication channel, at operation 5734, the master device 100" transmits and receives data to and from the base station by using the communication relay function performed by the slave device 200". When the quality of the communication channel between the master device 100" and the base station 1 is not superior to the quality of the communication channel between the slave device 200" and the base station 1, the master device 100" maintains a communication relay function via the slave device 200" because it is advantageous to use the slave device 200" as a communication relay.

Figure 8:
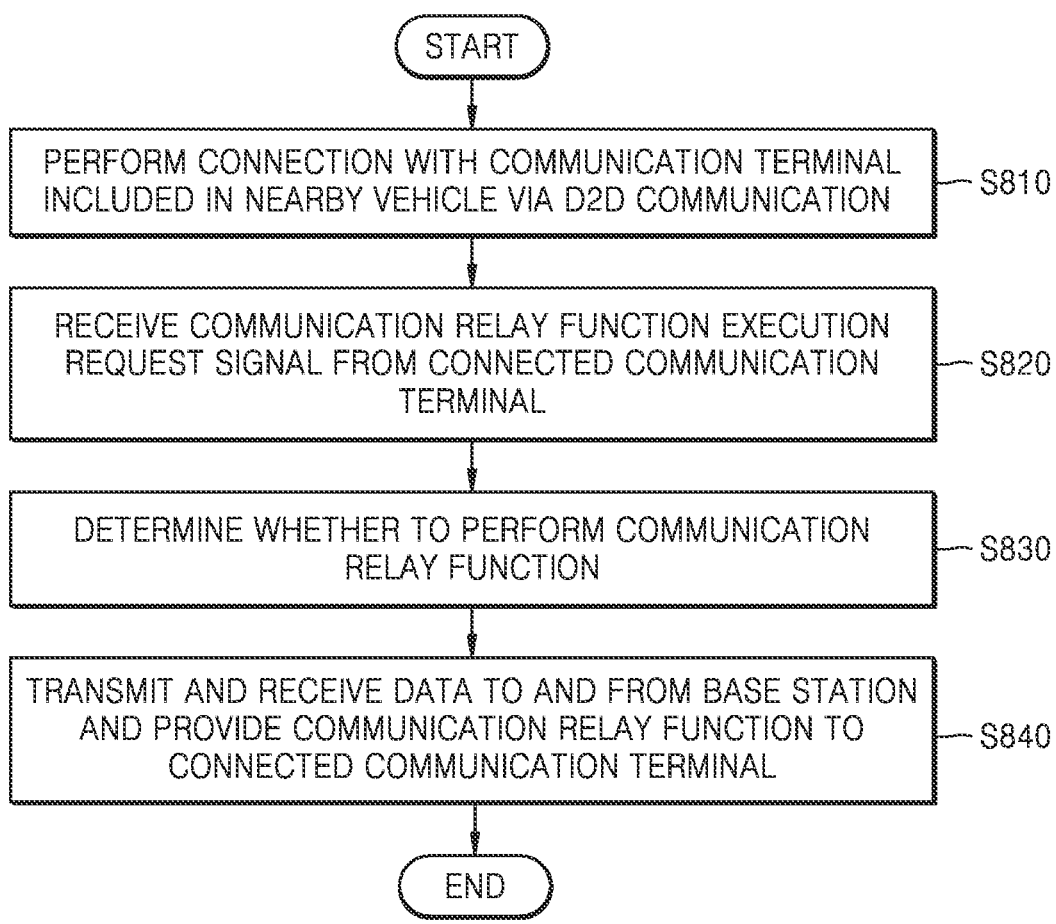
FIG. 8 is a flowchart of an operation method of a communication device, according to an embodiment of the disclosure.

FIG. 8 is a flowchart of an operation method of a communication device, according to an embodiment of the disclosure. Unlike the embodiments described with reference to FIGS. 1 to 7 in which the communication device 100 mounted on the host vehicle (e.g., the host vehicle 10 of FIG. 1) uses, as a communication relay, the communication terminal (e.g., the communication terminal 200 of FIG. 1) included in the nearby vehicle (20 of FIG. 1), the embodiment shown in FIG. 8 is an embodiment in which the communication device 100 is used as a communication relay. Because the nearby vehicle 20 and the communication terminal 200 are the same as those described with reference to FIGS. 1 to 7, descriptions thereof will be omitted below.

Referring to FIG. 8, in operation 5810, the communication device 100 performs a connection with the communication terminal 200 included in the nearby vehicle 20 via D2D communication. The communication device 100 may perform a D2D connection with at least one communication terminal respectively mounted on at least one vehicle that is stopped or driving in a vicinity by using at least one of the communication schemes including, for example, Wi-Fi direct, mobile Bluetooth™, LTE-D2D, and 5G D2D.

In operation 5820, the communication device 100 receives a communication relay function execution request signal from the connected communication terminal 200. In an embodiment, the communication device 100 may receive, from the communication terminal 200, SII and device identification information (e.g., a device ID) of the communication terminal 200, together with the communication relay function execution request signal. In an embodiment, the communication device 100 may receive SII included in eSIM information from the communication terminal 200.

In operation 5830, the communication device 100 determines whether to perform a communication relay function. In an embodiment, the communication device 100 may independently monitor whether mmWave communication is being performed with a base station, and determine whether to perform a communication relay function based on a result of the monitoring. For example, when identifying as a result of the monitoring that the communication device 100 is not transmitting and receiving data to and from the base station via mmWave communication, the communication device 100 may determine to perform a communication relay function.

In an embodiment, the communication device 100 may be set in advance to automatically determine execution of a communication relay function when receiving a communication relay function execution request. For example, when the host vehicle 10 equipped with the communication device 100 is a public transportation vehicle such as a bus, the communication device 100 may be preset to automatically perform a communication relay function for public interest purposes.

In another embodiment, when a communication relay function execution request signal is received from the communication terminal 200 of the nearby vehicle 20, the communication device 100 may receive a user input as to whether to perform a communication relay function, and determine whether to perform the communication relay function based on the user input. For example, when receiving a communication relay function execution request signal, the communication device 100 may transmit the communication relay function execution request signal via the TCU of the host vehicle 10, and control a display within the vehicle (e.g., a center information display (CID) to display thereon a communication relay function execution request signal and a user interface (UI) requesting a user input as to whether to perform the communication relay function. In an embodiment, the UI may be a graphical user interface (GUI). When a user input for accepting execution of the communication relay function is received via the UI, the communication device 100 may receive a related signal from the TCU of the host vehicle 10 and determine to perform the communication relay function.

In operation 5840, the communication device 100 transmits and receives data to and from the base station, and provides a communication relay function to the connected communication terminal 200.

Figure 9:
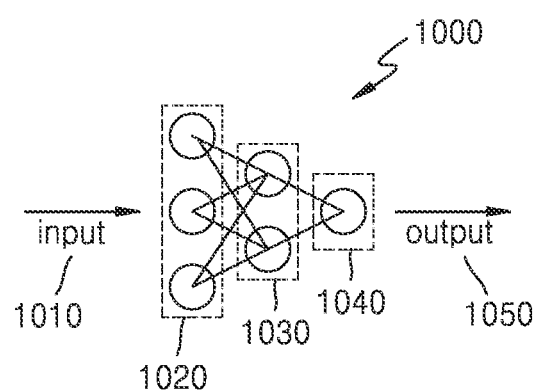
FIG. 9 is a diagram for describing an operation performed using artificial intelligence (AI) technology, according to an embodiment of the disclosure.

FIG. 9 is a diagram for describing an operation performed using AI technology, according to an embodiment of the disclosure.

In detail, at least one of i) an operation of performing a connection with a communication terminal included in a vehicle stopped or driving in a vicinity of a vehicle via D2D communication, ii) an operation of transmitting SIM information of the communication device 100 to the connected communication terminal, iii) an operation of requesting the communication terminal to perform a communication relay function with a base station, and iv) an operation of transmitting and receiving, in response to a communication relay function acceptance signal being received from the communication terminal, data to and from the base station by using the communication relay function performed by the communication terminal may be performed by the communication device 100 using AI technology that performs computations via a neural network.

AI technology is a technology that obtains a desired result by performing processing such as analysis and/or classification on input data based on computations through a neural network.

The AI technology may be implemented using algorithms. In this case, an algorithm or a set of algorithms for implementing the AI technology are called a neural network.

Here, the neural network may receive input data, perform computations for the analysis and/or the classification, and output resultant data. In order for the neural network to accurately output the resultant data corresponding to the input data, training the neural network is needed. In this case, 'training' may mean training the neural network to discover or learn by itself a method of analyzing pieces of input data fed to the neural network, a method of classifying the pieces of input data, and/or a method of extracting features necessary for generating resultant data from the pieces of input data. In detail, through a training process, the neural network may optimize weight values therein by being trained using training data (e.g., a plurality of different images). Then, a desired result is output by processing input data via the neural network having the optimized weight values.

When the neural network includes a plurality of hidden layers which are interior layers for performing computations, i.e., when a depth of the neural network where computations occur increases, the neural network may be classified as a deep neural network (DNN). Examples of a neural network may include, are not limited to, a convolutional neural network (CNN), a DNN, a recurrent neural network (RNN), a restricted Boltzmann machine (RBM), a deep belief network (DBN), a bidirectional recurrent DNN (BRDNN), and a deep Q-network (DQN). Furthermore, the neural network may be subdivided. Furthermore, a CNN may be subdivided into a deep CNN (DCNN), a capsule neural network (Capsnet) (not shown), or the like.

An 'AI model' may be a neural network including at least one layer operating to receive input data and output a desired result. Furthermore, the 'AI model' may refer to an algorithm or a set of a plurality of algorithms for performing computations via a neural network and outputting a desired result, a processor for executing the algorithm (or set of algorithms), software for executing the algorithm (or set of algorithms), or hardware for executing the algorithm (or set of algorithms).

The at least one of i) the operation of performing a connection with the communication terminal included in the vehicle stopped or driving in the vicinity of the vehicle via D2D communication, ii) the operation of transmitting SIM information of the communication device 100 to the connected communication terminal, iii) the operation of requesting the communication terminal to perform the communication relay function with the base station, and iv) the operation of transmitting and receiving, in response to the communication relay function acceptance signal being received from the communication terminal, data to and from the base station by using the communication relay function performed by the communication terminal may be performed based on the AI model.

Referring to FIG. 9, a neural network 1000 may receive training data and be trained using the training data. In addition, the trained neural network 1000 may receive input data 1010 as an input to an input terminal 1020, and the input terminal 1020, a hidden layer 1030, and an output terminal 1040 may each perform computations for analyzing the input data 1010 and data from a previous layer and outputting output data 1050. Although FIG. 9 shows that the hidden layer 1030 is a single layer, this is merely an example, and the hidden layer 1030 may be composed of a plurality of layers.

In an embodiment of the disclosure, the neural network 1000 may be trained to receive, via a D2D connection, quality information of a communication channel generated with the base station from at least one communication terminal respectively included in at least one vehicle in the vicinity of the vehicle, and determine, based on the received quality information of the communication channel, a communication terminal from which to request execution of a communication relay function from among the at least one communication terminal.

In an embodiment of the disclosure, the neural network 1000 may be trained to receive driving information including location information, driving direction information, destination information, and route information from the at least one vehicle, and select one of the at least one communication terminal based on at least one of information to at least one of the received driving information and communication channel quality information.

In an embodiment of the disclosure, the neural network 1000 may be trained to monitor the quality of a first communication channel generated between the communication device 100 and the base station, compare the quality of a second communication channel for a communication terminal performing a communication relay function with the quality of the first communication channel, and based on a comparison result, determine whether to release a D2D connection with the communication terminal.

In an embodiment of the disclosure, data or program code related to the neural network 1000 for performing at least one of i) the operation of performing a connection with the communication terminal included in the vehicle stopped or driving in the vicinity of the vehicle via D2D communication, ii) the operation of transmitting SIM information of the communication device 100 to the connected communication terminal, iii) the operation of requesting the communication terminal to perform the communication relay function with the base station, and iv) the operation of transmitting and receiving, in response to the communication relay function acceptance signal being received from the communication terminal, data to and from the base station by using the communication relay function performed by the communication terminal may be stored in the memory (e.g., the memory 124 of FIG. 2), and training of the neural network 1000 may be performed by the processor (e.g., the processor 122 of FIG. 2).

Alternatively, the neural network 1000 for performing at least one of i) the operation of performing a connection with the communication terminal included in the vehicle stopped or driving in the vicinity of the vehicle via D2D communication, ii) the operation of transmitting SIM information of the communication device 100 to the connected communication terminal, iii) the operation of requesting the communication terminal to perform the communication relay function with the base station, and iv) the operation of transmitting and receiving, in response to the communication relay function acceptance signal being received from the communication terminal, data to and from the base station by using the communication relay function performed by the communication terminal may be implemented in a separate electronic device (not shown) or a processor (not shown) distinguished from the communication device 100.

The computations via the neural network 1000 may also be performed by a server (e.g., server 2000 of FIG. 10) capable of communicating with the communication device 100 through a wireless communication network, according to an embodiment of the disclosure. A communication between the communication device 100 and the server 2000 is described with reference to FIGS. 10 and 11.

Figure 10:
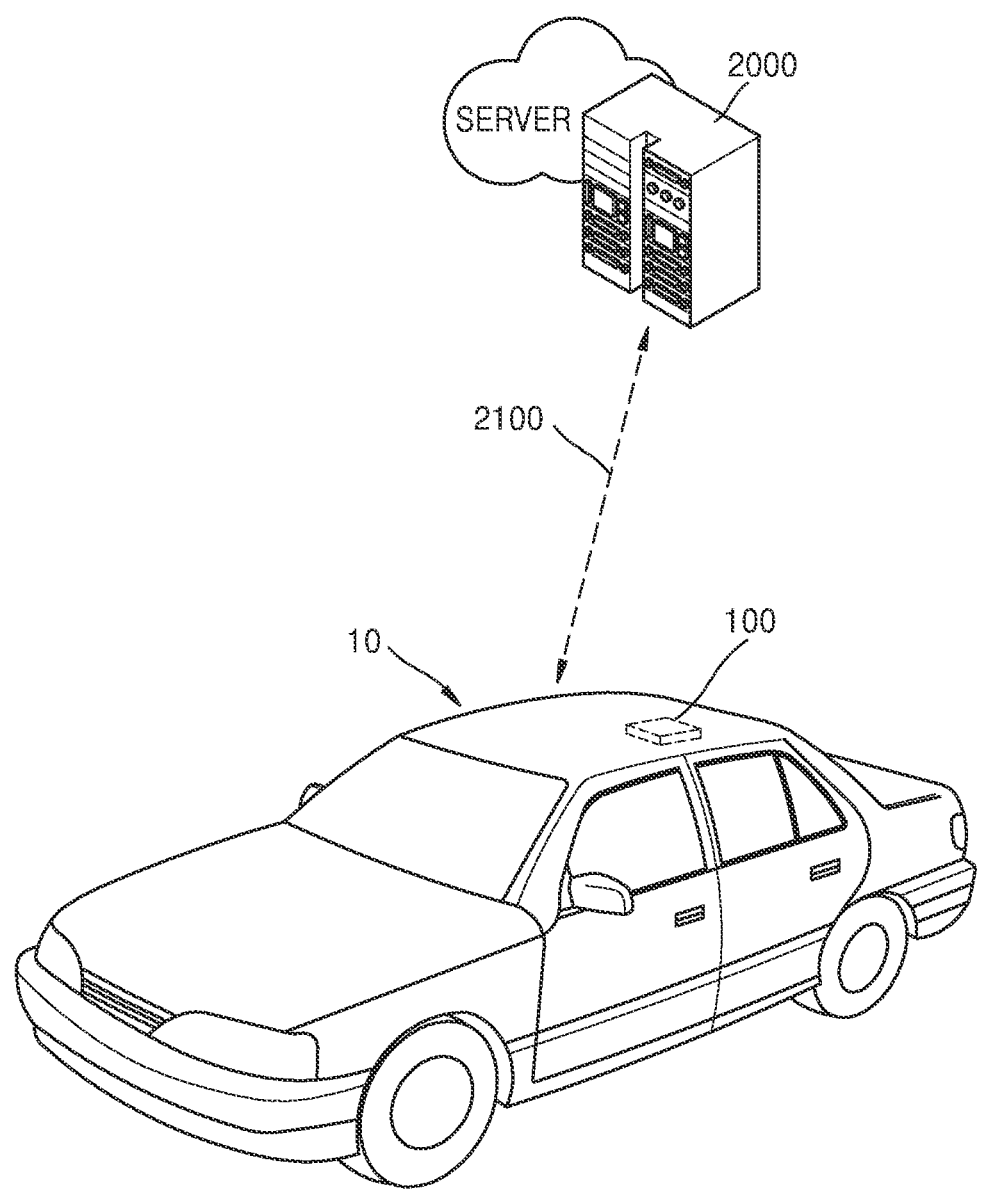
FIG. 10 is a diagram illustrating a communication device operating in conjunction with a server, according to an embodiment of the disclosure.

FIG. 10 is a diagram illustrating a communication device operating in conjunction with a server, according to an embodiment of the disclosure.

The server 2000 may transmit and receive data to and from the communication device 100 via a communication network and process the data.

Figure 11:
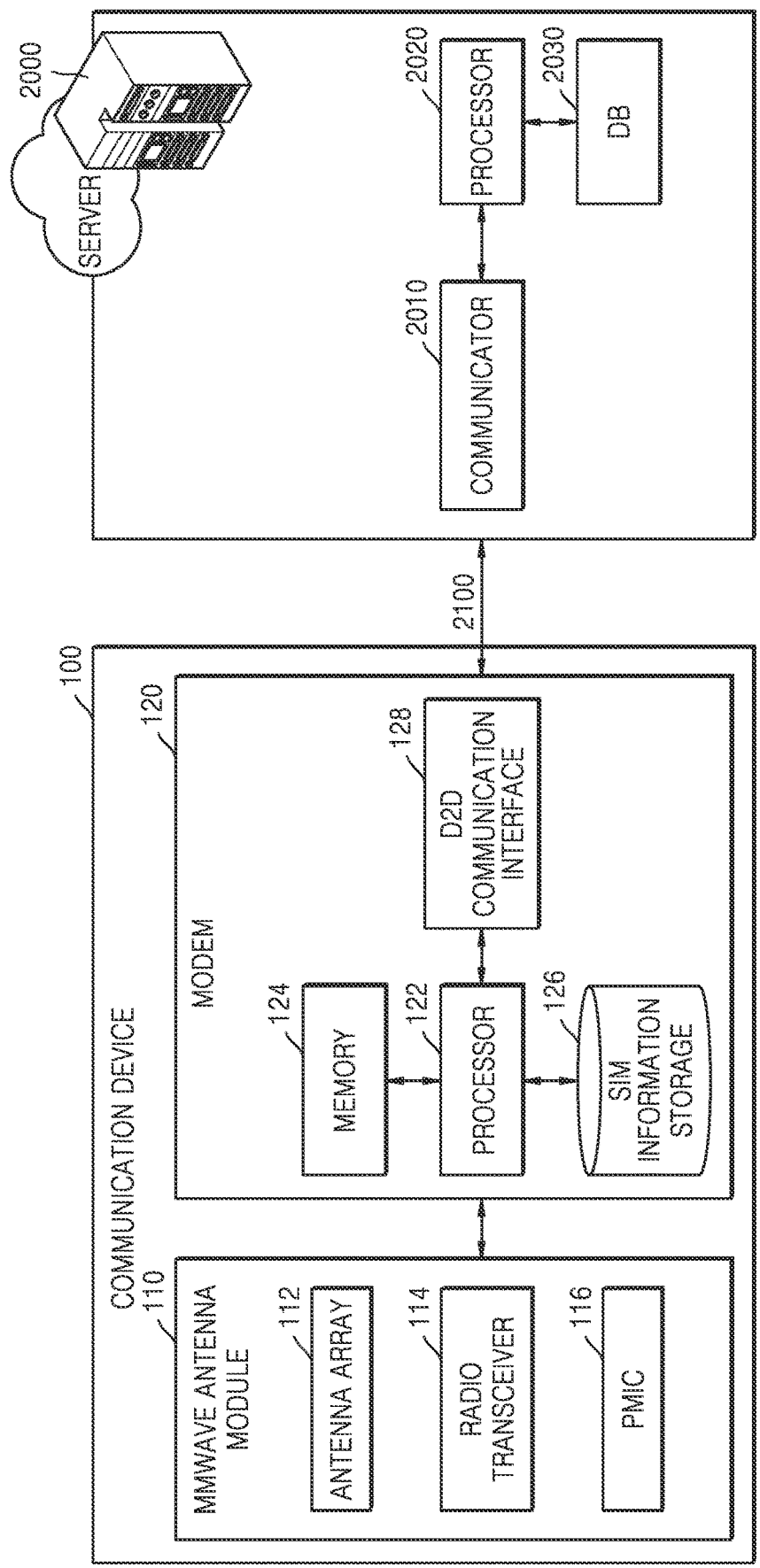
FIG. 11 is a diagram for describing the embodiment of FIG. 10 in detail according to an embodiment of the disclosure.

Referring to FIGS. 10 and 11, the server 2000 may include a communicator 2010 communicating with the communication device 100 and a processor 2020 for performing at least one instruction.

In an embodiment of the disclosure, the server 2000 may determine whether to request a communication terminal included in a nearby vehicle to perform a communication relay function by performing computations via the neural network 1000 described with reference to FIG. 9. In detail, the server 2000 may train an AI model and store the trained AI model. Furthermore, the server 2000 may use the trained AI model to perform at least one of i) the operation of performing a connection with the communication terminal included in the vehicle stopped or driving in the vicinity of the vehicle via D2D communication, ii) the operation of transmitting SIM information of the communication device 100 to the connected communication terminal, iii) the operation of requesting the communication terminal to perform the communication relay function with the base station, and iv) the operation of transmitting and receiving, in response to the communication relay function acceptance signal being received from the communication terminal, data to and from the base station by using the communication relay function performed by the communication terminal.

In general, the communication device 100 may have limited memory storage capacity, computation processing speed, training data set collection capability, etc., compared to the server 2000. Thus, the server 2000 may perform operations requiring storage of a large amount of data and a large number of computations, and then transmit necessary data and/or an AI model to the communication device 100 through a communication network. Then, the communication device 100 may receive and use the necessary data and/or the AI model via the server 2000 to thereby quickly and easily perform necessary operations without a large capacity memory and a processor with high-speed computation capability.

In an embodiment of the disclosure, the server 2000 may include the neural network 1000 described with reference to FIG. 9.

FIG. 11 is a diagram for describing the embodiment of FIG. 10 in detail according to an embodiment of the disclosure.

Referring to FIG. 11, the server 2000 may include the communicator 2010, the processor 2020, and a database (DB) 2030.

The communicator 2010 communicates with an external device (not shown, e.g., a server) through a wireless communication network 2100. Here, the external device may include a server (e.g., the server 2000) capable of performing at least one of computations required by the communication device 100 or transmitting data required by the communication device 100.

The communicator 2010 may include at least one communication module such as a short-range communication module, a wired communication module, a mobile communication module, and a broadcast receiving module. Here, the at least one communication module includes at least one of a tuner for performing broadcast reception and a communication module capable of performing data transmission and reception via a network that conforms to communication standards such as Bluetooth™, wireless local area network (WLAN), (or Wi-Fi), wireless broadband (Wibro), World Interoperability for Microwave Access (Wimax), code division multiple access (CDMA), wide-band CDMA (WCDMA), the Internet, third generation (3G), fourth generation (4G), 5G, and/or a communication method using mmWave.

For example, when the communicator 2010 performs communication using mmWave, large amounts of data may be transmitted and received at high speed. In detail, the host vehicle 10 may use mmWave to quickly receive large amounts of data and provide data necessary for safety of the host vehicle 10 (e.g., data necessary for autonomous driving, data necessary for a navigation service, etc.), content used by a user (e.g., movies, music, etc.), etc., thereby increasing the safety of the host vehicle 10 and/or user convenience.

The mobile communication module included in the communicator 2010 may communicate with another device located at a remote location via a communication network conforming to communication standards such as 3G, 4G, and/or 5G. Here, a communication module that communicates with another device located at a remote location may be referred to as a 'remote communication module'.

The processor 2020 controls all operations of the server 2000. For example, the processor 2020 may perform required operations by executing at least one instruction or program stored in the server 2000.

The DB 2030 may include a memory (not shown), and store, in the memory, at least one of at least one instruction, program, and data necessary for the server 2000 to perform a certain operation. Furthermore, the DB 2030 may store pieces of data necessary for the server 2000 to perform computations via a neural network.

In an embodiment of the disclosure, the server 2000 may store the neural network 1000 described with reference to FIG. 9. The neural network 1000 may be stored in at least one of the processor 2020 and the DB 2030. The neural network 1000 included in the server 2000 may be a trained neural network.

Furthermore, the server 2000 may transmit the trained neural network to a modem 120 of the communication device 100 via the communicator 2010. As a result, the communication device 100 may obtain and store the trained neural network, and obtain desired output data via the neural network.

A program executed by the communication device 100 described in this specification may be implemented as a hardware component, a software component, and/or a combination of the hardware component and the software component. A program may be executed by any system capable of executing computer-readable instructions.

Software may include a computer program, a piece of code, an instruction, or a combination of one or more thereof, and configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, etc.), optical recording media (e.g., compact disc (CD)-ROM, a digital versatile disc (DVD), etc.), etc. The computer-readable recording media may be distributed over computer systems connected through a network so that computer-readable code may be stored and executed in a distributed manner. The media may be read by a computer, stored in a memory, and executed by a processor.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the 'non-transitory storage medium' may include a buffer in which data is temporarily stored.

Furthermore, programs according to embodiments disclosed in the specification may be included in a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of an electronic device or through an electronic market (e.g., Galaxy Store). For such electronic distribution, at least a part of the software program may be stored in the storage medium or may be temporarily generated. In this case, the storage medium may be a storage medium of a server of a manufacturer of a vehicle or communication device, a server of the electronic market, or a relay server for temporarily storing the software program.

In a system consisting of the communication device 100, the server (e.g., server 2000 of FIGS. 10 and 11), and another electronic device, the computer program product may include a storage medium of the server 2000 or a storage medium of the other electronic device. Alternatively, in a case where there is a third device (e.g., a smartphone) communicatively connected to the communication device 100, the computer program product may include a storage medium of the third device. Alternatively, the computer program product may include a software program itself that is transmitted from the communication device 100 to the other electronic device or the third device or that is transmitted from the third device to the other electronic device.

In this case, one of the communication device 100, the other electronic device, and the third device may execute the computer program product to perform methods according to embodiments of the disclosure. Alternatively, two or more of the communication device 100, the other electronic device, and the third device may execute the computer program product to perform the methods according to the embodiments of the disclosure in a distributed manner.

For example, the communication device 100 may execute the computer program product stored in the memory (124 of FIG. 2) to control the other electronic device communicatively connected to the communication device 100 to perform the methods according to the embodiments of the disclosure.

In another example, the third device may execute the computer program product to control the other electronic device communicatively connected to the third device to perform the methods according to the embodiments of the disclosure.

In a case where the third device executes the computer program product, the third device may download the computer program product from the communication device 100 and execute the downloaded computer program product. Alternatively, the third device may execute the computer program product that is pre-loaded therein to perform the methods according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operation method of a communication device mounted on a vehicle, the operation method comprising:
identifying, from among vehicles stopped or driving in a vicinity of the vehicle, at least one vehicle including a communication terminal capable of connecting via device-to-device communication;
identifying whether at least one communication terminal included in the at least one vehicle, respectively, is able to perform a communication relay function with a base station;
based on identifying that the at least one communication terminal is able to perform the communication relay function with the base station, connecting with the at least one communication terminal via the device-to-device communication;
after connecting with the at least one communication terminal, transmitting, to the at least one communication terminal, subscriber identity module (SIM) information of the communication device;
obtaining information about a quality of each communication channel generated between the at least one communication terminal and the base station, respectively, and storing the information about the quality of each communication channel, respectively;
based on a quality of a communication channel generated between the communication device and the base station deteriorating, requesting execution of a communication relay function from a determined communication terminal determined among the at least one communication terminal based on a communication channel quality; and
in response to a communication relay function acceptance signal being received from the determined communication terminal, transmitting and receiving data to and from the base station by using the communication relay function performed by the determined communication terminal.

2. The operation method of claim 1, wherein the requesting of the execution of the communication relay function from the determined communication terminal comprises:
determining a communication terminal having a highest communication channel quality indicator, based on pieces of information about the communication channel quality, which are respectively obtained from the at least one communication terminal; and
requesting the execution of the communication relay function from the determined communication terminal.

3. The operation method of claim 1, further comprising:
obtaining driving information including location information, driving direction information, destination information, and route information from each of the at least one vehicle,
wherein the determining of the determined communication terminal from which to request the execution of the communication relay function comprises selecting one of the at least one communication terminal based on at least one of the driving information or information about the communication channel quality.

4. The operation method of claim 1, further comprising:
monitoring a quality of a first communication channel generated between the communication device and the base station.

5. The operation method of claim 4, further comprising:
comparing information about the quality of the first communication channel, which is obtained as a result of the monitoring, with information about a quality of a second communication channel for the determined communication terminal performing the communication relay function; and
based on a result of the comparing, determining whether to release a device-to-device connection with the determined communication terminal.

6. The operation method of claim 5, wherein the determining of whether to release the device-to-device connection comprises:
in response to the quality of the first communication channel being superior to the quality of the second communication channel, determining to release the device-to-device connection with the determined communication terminal; and
after releasing the device-to-device connection, directly connecting to the base station via millimeter wave (mmWave) communication.

7. The operation method of claim 1, further comprising:
receiving a relay function execution request signal from at least one nearby vehicle; and
in response to receiving the relay function execution request signal, performing a relay function for data transmission and reception between the base station and the at least one nearby vehicle.

8. A communication device mounted on a vehicle, the communication device comprising:
a millimeter wave (mmWave) antenna circuit configured to connect with a base station via mmWave communication and transmit and receive data; and
a modulator-demodulator (modem) connected to the mmWave antenna circuit and configured to control an operation of the mmWave antenna circuit,
wherein the modem comprises:
a memory storing a program including one or more instructions,
a processor configured to execute the one or more instructions of the program stored in the memory,
a subscriber identity module (SIM) information storage storing subscriber identity information of the communication device, and
a device-to-device communication interface configured to perform device-to-device communication, and
wherein the processor is further configured to:
identify, from among vehicles stopped or driving in a vicinity of the vehicle, at least one vehicle including a communication terminal capable of connecting via device-to-device communication,
identify whether at least one communication terminal included in the at least one vehicle, respectively, is able to perform a communication relay function with the base station,
based on identifying that the at least one communication terminal is able to perform the communication relay function with the base station, control the device-to-device communication interface to connect with the at least one communication terminal via the device-to-device communication,
after connecting with the at least one communication terminal, transmit, to the at least one communication terminal, the subscriber identity information,
obtain information about a quality of each communication channel generated between the at least one communication terminal and the base station, respectively,
based on a quality of a communication channel generated between the communication device and the base station deteriorating, and request execution of a communication relay function from a determined communication terminal determined among the at least one communication terminal based on a communication channel quality, and
in response to a communication relay function acceptance signal being received from the determined communication terminal, transmit and receive data to and from the base station by using the communication relay function performed by the determined communication terminal.

9. The communication device of claim 8, wherein the processor is further configured to:
determine a communication terminal having a highest communication channel quality indicator, based on pieces of information about the communication channel quality, which are respectively obtained from the at least one communication terminal.

10. The communication device of claim 8, wherein the processor is further configured to:
obtain driving information including location information, driving direction information, destination information, and route information from each of the at least one vehicle, and
based on at least one of the driving information or information about the communication channel quality, select one of the at least one communication terminal.

11. The communication device of claim 8, wherein the processor is further configured to:
monitor a quality of a first communication channel generated between the communication device and the base station.

12. The communication device of claim 11, wherein the processor is further configured to:
compare information about the quality of the first communication channel, which is obtained via the monitoring, with information about a quality of a second communication channel for the determined communication terminal performing the communication relay function, and
based on a result of the comparing, determine whether to release a device-to-device connection with the determined communication terminal.

13. The communication device of claim 12, wherein the processor is further configured to:
in response to the quality of the first communication channel being superior to the quality of the second communication channel, determine to release the device-to-device connection with the determined communication terminal, and
directly connect to the base station via the mmWave communication.

14. The communication device of claim 8, wherein the processor is further configured to:
receive a relay function execution request signal from at least one nearby vehicle via the device-to-device communication interface, and in response to receiving the relay function execution request signal, perform a relay function for data transmission and reception between the base station and the at least one nearby vehicle.

15. A non-transitory computer program product comprising a computer-readable storage medium including instructions which, when executed by a processor of a communication device mounted on a vehicle, cause the processor to perform operations comprising:
identifying, from among vehicles stopped or driving in a vicinity of the vehicle, at least one vehicle including a communication terminal capable of connecting via device-to-device communication;
identifying whether at least one communication terminal included in the at least one vehicle, respectively, is able to perform a communication relay function with a base station;
based on identifying that the at least one communication terminal is able to perform the communication relay function with the base station, connecting with the at least one communication terminal via the device-to-device communication;
after connecting with the at least one communication terminal, transmitting, to the at least one communication terminal, subscriber identity module (SIM) information of the communication device;
obtaining information about a quality of each communication channel generated between the at least one communication terminal and the base station, respectively, and storing the information about the quality of each communication channel, respectively;
based on a quality of a communication channel generated between the communication device and the base station deteriorating, requesting execution of a communication relay function from a determined communication terminal determined among the at least one communication terminal based on a communication channel quality; and
in response to a communication relay function acceptance signal being received from the determined communication terminal, transmitting and receiving data to and from the base station by using the communication relay function performed by the determined communication terminal.

* * * * *